(12) United States Patent
Saito et al.

(10) Patent No.: US 7,965,331 B2
(45) Date of Patent: Jun. 21, 2011

(54) SOLID STATE IMAGING ELEMENT, IMAGE PICKUP DEVICE AND METHOD OF DRIVING SOLID STATE IMAGING ELEMENT

(75) Inventors: Mariko Saito, Miyagi (JP); Hideki Wako, Miyagi (JP); Katsumi Ikeda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 379 days.

(21) Appl. No.: 12/176,871

(22) Filed: Jul. 21, 2008

(65) Prior Publication Data
US 2009/0027535 A1    Jan. 29, 2009

(30) Foreign Application Priority Data

Jul. 23, 2007  (JP) .............. P2007-190423
Nov. 19, 2007  (JP) .............. P2007-298936

(51) Int. Cl.
*H04N 3/14*  (2006.01)
*H04N 5/335*  (2006.01)

(52) U.S. Cl. ........................ 348/322; 348/315
(58) Field of Classification Search ................ None
See application file for complete search history.

(56) References Cited

U.S. PATENT DOCUMENTS

| | | | | |
|---|---|---|---|---|
| 4,559,550 A | * | 12/1985 | Koike et al. | 257/233 |
| 2002/0039144 A1 | * | 4/2002 | Yamada | 348/311 |
| 2006/0092304 A1 | * | 5/2006 | Hirota | 348/311 |
| 2007/0012953 A1 | * | 1/2007 | Watanabe | 257/215 |
| 2008/0129853 A1 | * | 6/2008 | Watanabe | |

FOREIGN PATENT DOCUMENTS

JP    2007-27977 A  *  2/2007

* cited by examiner

*Primary Examiner* — Lin Ye
*Assistant Examiner* — Dennis Hogue
(74) *Attorney, Agent, or Firm* — Birch, Stewart, Kolasch & Birch, LLP

(57) ABSTRACT

A solid state imaging element comprises: photoelectric conversion elements; a plurality of vertical electric charge transfer passages that transfer, in a vertical direction, electric charges generated by the photoelectric conversion elements; and a horizontal electric charge transfer passage that transfers, in a horizontal direction perpendicular to the vertical direction, the electric charges transferred in the vertical electric charge transfer passage, wherein the horizontal electric charge transfer passage comprises a plurality of electric charge transferring stages each of which operates as an electric charge accumulating region or a barrier region according to a level of an applied voltage, and each of said plurality of electric charge transferring stages is connected to plural ones of the vertical electric charge transfer passages.

6 Claims, 29 Drawing Sheets

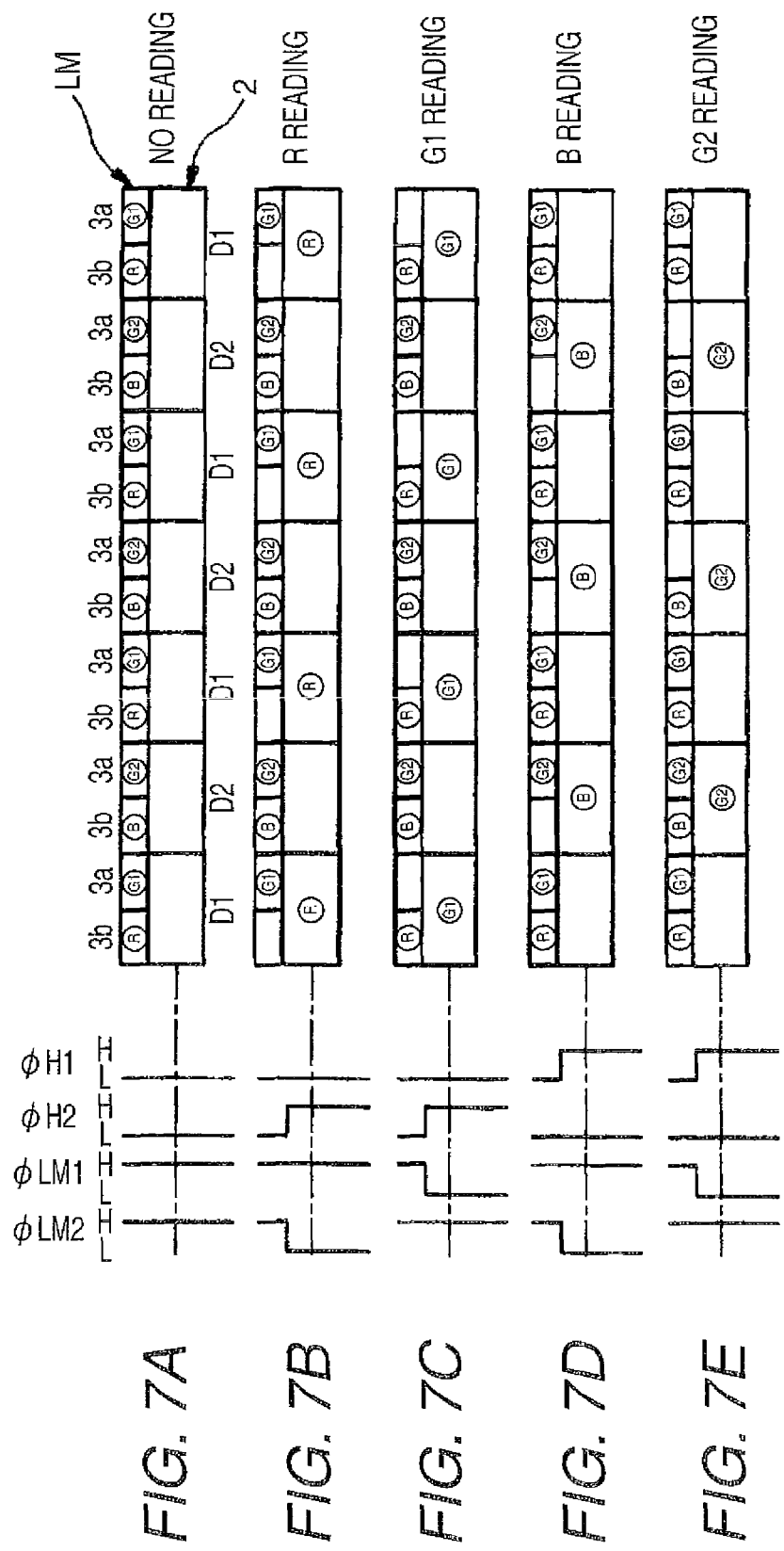

SOLID STATE IMAGING ELEMENT, IMAGE PICKUP DEVICE AND METHOD OF DRIVING SOLID STATE IMAGING ELEMENT

BACKGROUND OF THE INVENTION

1. Field of the Invention

The present invention relates to a solid state imaging element including: a photoelectric conversion element; a large number of vertical electric charge transfer passages for transferring electric charges, which are generated in the photoelectric conversion element, in the vertical direction; and a horizontal electric charge transfer passage for transferring electric charges, which are transferred in the vertical electric charge transfer passages, in the horizontal direction perpendicular to the vertical direction.

2. Description of the Related Art

FIG. 29 is a partially enlarged view showing a commonly used solid state imaging element.

The solid state imaging element shown in FIG. 29 includes: a photoelectric conversion element not shown in the drawing two-dimensionally arranged on a semiconductor board; a large number of vertical electric charge transfer passages 11 for transferring electric charges, which are generated by the photoelectric conversion element, in the vertical direction Y; a horizontal electric charge transfer passage 12 for transferring electric charges, which are transferred in the vertical electric charge transfer passages 11, to the horizontal direction X perpendicular to the vertical direction Y; an electric charge accumulating region 16 for connecting the vertical electric charge transfer passages 11 with the horizontal electric charge transfer passage 12; and a line memory LM including a memory electrode 13 formed in an upper portion of the electric charge accumulating region 16. The vertical electric charge transfer passage 11, the electric charge accumulating region 16 and the horizontal electric charge transfer passage 12 are formed out of, for example, an n-type impurity layer.

In an upper portion of the horizontal electric charge transfer passage 12, a plurality of electrode sets, in which the reverse-L-shaped electrode 14 and the rectangular electrode 15 are arranged in the horizontal direction X in this order, are arranged in the horizontal direction X. This electrode set includes: a first electrode set upon which the transmission pulse φH1 is applied; and a second electrode set upon which the transmission pulse φH2 is applied, wherein these are alternately arranged in the horizontal direction X. When the transmission pulse φH1 becomes the high level and the transmission pulse φH2 becomes the low level, the horizontal electric charge transfer passage 12 in a lower portion of the first electrode set operates as an electric charge accumulating region in which the electric charges can be accumulated and the horizontal electric charge transfer passage 12 in the lower portion of the second electrode set operates as a barrier region between the electric charge accumulating regions. On the other hand, when the transmission pulse φH1 becomes the low level and the transmission pulse φH2 becomes the high level, the horizontal electric charge transfer passage 12 in a lower portion of the second electrode set operates as an electric charge accumulating region in which the electric charges can be accumulated and the horizontal electric charge transfer passage 12 in the lower portion of the first electrode set operates as a barrier region between the electric charge accumulating regions. As described above, in the horizontal electric charge transfer passage 12, a plurality of electric charge transferring stages, which operate as a barrier region or an electric charge accumulating region according to a level of the applied voltage, are formed out of the first and the second electrode set.

JP-A-2007-27977 discloses a solid state imaging element having a vertical electric charge transfer passage, a line memory and a horizontal electric charge transfer passage.

In the solid state imaging element composed as shown in FIG. 29, one electric charge transferring stage is correspondingly provided for one vertical electric charge transfer passage 11. Therefore, in the case where a pixel size is reduced without changing a width in the horizontal direction of the horizontal electric charge passage 12 so as to meet the requirement of increasing the number of pixels, a width in the horizontal direction of the electric charge transferring stage (shown by the reference mark A in FIG. 29) is reduced and an electric charge transferring capacity of the horizontal electric charge transfer passage 12 is decreased. It can be considered that a width of each electric charge transferring stage is expanded so as to ensure the electric charge transferring capacity. However, in this case, a width of the entire horizontal electric charge transfer passage 12 is extended in the horizontal direction. Accordingly, the electrostatic capacity is increased and the electric power consumption is raised. Further, in accordance with the increase in the number of pixels, the number of the electric charge transferring stages is increased. Accordingly, there is a possibility that the transmission efficiency is deteriorated in the case of high speed driving.

SUMMARY OF THE INVENTION

The present invention has been accomplished in view of the circumstances described above. An object of the present invention is to provide a solid state imaging element capable of solving the problems of a decrease in the electric charge transferring capacity of the horizontal electric charge transfer passage, an increase in the electric power consumption and a deterioration of the transmission efficiency even when the number of pixels is increased without increasing the size of the horizontal electric charge transfer passage.

A solid state imaging element of the present invention comprises: photoelectric conversion elements; a plurality of vertical electric charge transfer passages that transfer, in a vertical direction, electric charges generated by the photoelectric conversion elements; and a horizontal electric charge transfer passage that transfers, in a horizontal direction perpendicular to the vertical direction, the electric charges transferred in the vertical electric charge transfer passage, wherein the horizontal electric charge transfer passage comprises a plurality of electric charge transferring stages each of which operates as an electric charge accumulating region or a barrier region according to a level of an applied voltage, and each of said plurality of electric charge transferring stages is connected to plural ones of the vertical electric charge transfer passages.

A solid state imaging element of the present invention may further comprises a line memory, the line memory comprising: a plurality of electric charge accumulating regions each of which connects each of said plurality of vertical electric charge transfer passages with the horizontal electric charge transfer passages; and memory electrodes independently provided in an upper portion of each of said plurality of electric charge accumulating regions, wherein voltage can be each independently applied upon the memory electrodes.

A solid state imaging element of the present invention may further comprises a line memory, the line memory comprising: a plurality of electric charge accumulating regions each of which connects each of said plurality of vertical electric charge transfer passages with the horizontal electric charge transfer passages; and memory electrodes each of which is connected with different ones of the electric charge transferring stages and is independently arranged in an upper portion of adjacent two ones of the electric charge accumulating regions, wherein the memory electrodes comprises a first set of memory electrodes and a second set of memory electrodes that are each independently capable of applying voltage.

In a solid state imaging element of the present invention, the photoelectric conversion element may includes three types of photoelectric conversion elements that detect light of respectively different wave-length regions, and the three types of photoelectric conversion elements may be arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

An image pickup device of the present invention comprises: the solid state imaging element; and a driving section that drives the solid state imaging element, wherein each of the electric charge transferring stages is connected to two of the vertical electric charge transfer passages, the memory electrode comprises a first set of memory electrodes and a second set of memory electrodes that are each independently capable of applying voltage, and after electric charges have been accumulated in said plurality of electric charge accumulating regions respectively, the driving section controls voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

An image pickup device of the present invention comprises: the solid state imaging element; and a drive section that drives the solid state imaging element, wherein each of the electric charge transferring stages is connected to two of the vertical electric charge transfer passages, and after electric charges have been accumulated in said plurality of electric charge accumulating regions respectively, the driving section controls voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

In an image pickup device of the present invention, the photoelectric conversion elements may comprise three types of photoelectric conversion elements that detect light of respectively different wave-length regions, and the three types of photoelectric conversion elements may be arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

According to the present invention, there is provided a method of driving a solid state imaging element, the solid state imaging element comprising: photoelectric conversion elements; a plurality of vertical electric charge transfer passages that transfer, in a vertical direction, electric charges generated by the photoelectric conversion elements; and a horizontal electric charge transfer passage that transfers, in a horizontal direction perpendicular to the vertical direction, the electric charges transferred in the vertical electric charge transfer passage, wherein the horizontal electric charge transfer passage comprises a plurality of electric charge transferring stages each of which operates as an electric charge accumulating region or a barrier region according to a level of a applied voltage, and each of said plurality of electric charge transferring stages is connected to two of the vertical electric charge transfer passages, wherein the solid state imaging element further comprises a line memory, the line memory comprising: a plurality of electric charge accumulating regions each of which connects each of said plurality of vertical electric charge transfer passages with the horizontal electric charge transfer passages; and memory electrodes independently provided in an upper portion of each of said plurality of electric charge accumulating regions, and wherein voltage can be each independently applied upon the memory electrodes, the memory electrode includes a first set of memory electrodes and a second set of memory electrode that are each independently capable of applying voltage, the method comprising: after electric charges have been accumulated in said plurality of electric charge accumulating regions, controlling voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

According to the present invention, there is provided a method of driving a solid state imaging element, the solid state imaging element comprising: photoelectric conversion elements; a plurality of vertical electric charge transfer passages that transfer, in a vertical direction, electric charges generated by the photoelectric conversion elements; and a horizontal electric charge transfer passage that transfers, in a horizontal direction perpendicular to the vertical direction, the electric charges transferred in the vertical electric charge transfer passage, wherein the horizontal electric charge transfer passage comprises a plurality of electric charge transferring stages each of which operates as an electric charge accumulating region or a barrier region according to a level of a applied voltage, and each of said plurality of electric charge transferring stages is connected to two of the vertical electric charge transfer passages, wherein the solid state imaging element further comprises a line memory, the line memory comprising: a plurality of electric charge accumulating regions each of which connects each of said plurality of vertical electric charge transfer passages with the horizontal electric charge transfer passages; and memory electrodes each of which is connected with different ones of the electric charge transferring stages and is independently arranged in an upper portion of adjacent two ones of the electric charge accumulating regions, and wherein the memory electrodes comprises a first set of memory electrodes and a second set of memory electrodes that are each independently capable of applying voltage, the method comprising: after electric charges have been accumulated in said plurality of electric charge accumulating regions, controlling voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

In a method of driving a solid state imaging element of the present invention, the photoelectric conversion elements may comprise three types of photoelectric conversion elements that detect light of respectively different wave-length regions, and the three types of photoelectric conversion elements may be arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

BRIEF DESCRIPTION OF THE DRAWINGS

FIGS. 7A to 7E are diagrams for explaining operation of electric charge transmission from the line memory of the solid state imaging element shown in FIG. 1 to the horizontal electric charge transfer passage;

DETAILED DESCRIPTION OF THE INVENTION

Figure 1:
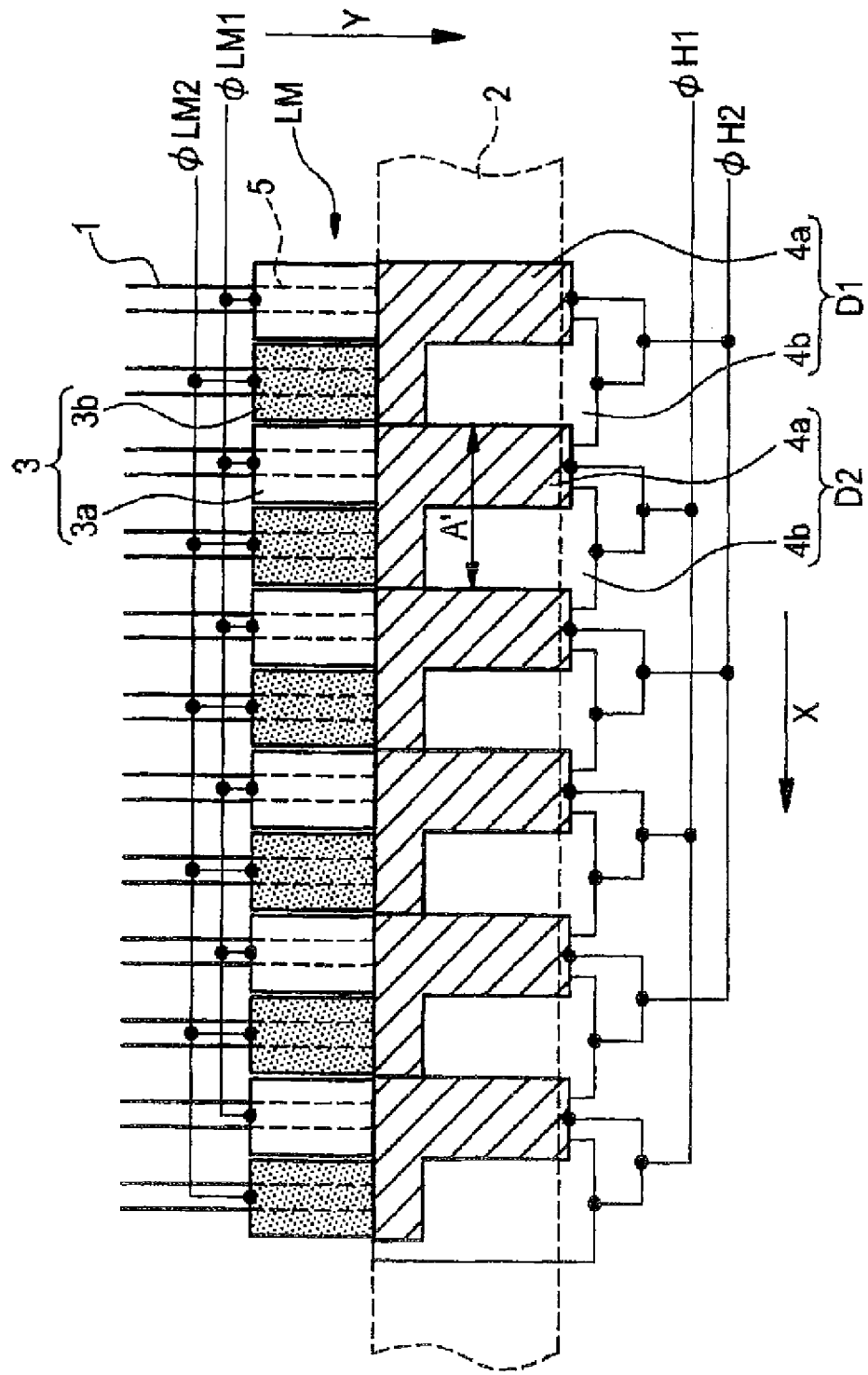
FIG. 1 is a partial schematic plan view showing an outline of the constitution of the solid state imaging element of the first embodiment of the present invention.

Referring to the drawings, an embodiment of the present invention will be explained below.

First Embodiment

FIG. 1 is a partial schematic plan view showing an outline of the constitution of the solid state imaging element of the first embodiment of the present invention.

The solid state imaging element shown in FIG. 1 includes: a photoelectric conversion element not shown in the drawing two-dimensionally arranged on a semiconductor board in the horizontal direction X and the vertical direction Y perpendicular to the horizontal direction X; a large number of vertical electric charge transfer passages 1, which are arranged in the horizontal direction X, for transferring electric charges, which are generated by the photoelectric conversion element, in the vertical direction Y; a horizontal electric charge transfer passage 2 for transferring electric charges, which are transferred in a large number of vertical electric charge transfer passages 1, to the horizontal direction X; an electric charge accumulating region 5 connecting each of the large number of vertical electric charge transfer passages 1 with the horizontal electric charge transfer passage 2; and a line memory LM including a memory electrode 3 ($3a$, $3b$) independently provided in an upper portion of the electric charge accumulating region 5. The vertical electric charge transfer passage 1, the electric charge accumulating region 5 and the horizontal electric charge transfer passage 2 are formed out of, for example, an n-type impurity layer which is formed on the P-well layer formed on the n-type semiconductor board.

In an upper portion of the horizontal electric charge transfer passage 2, a plurality of electrode sets, in which the reverse-L-shaped electrode $4a$ and the rectangular electrode $4b$ are arranged in the horizontal direction X in this order, are arranged in the horizontal direction X. These electrode sets include: an electrode set D1 upon which the transferring pulse φH2 is applied; and an electrode set D2 upon which the transferring pulse φH1 is applied, wherein these are alternately arranged in the horizontal direction X.

When the transmission pulse φH2 becomes the high level and the transmission pulse φH1 becomes the low level, the horizontal electric charge transfer passage 2 in a lower portion of the electrode set D1 operates as an electric charge accumulating region in which the electric charges can be accumulated and the horizontal electric charge transfer passage 2 in a lower portion of the electrode set D2 operates as a barrier region between the electric charge accumulating regions. On the other hand, when the transmission pulse φH2 becomes the low level and the transmission pulse φH1 becomes the high level, the horizontal electric charge transfer passage 2 in a lower portion of the electrode set D2 operates as an electric charge accumulating region in which the electric charges can be accumulated and the horizontal electric charge transfer passage 2 in the lower portion of the electrode set D2 operates as a barrier region between the electric charge accumulating regions. As described above, in the horizontal electric charge transfer passage 2, a plurality of electric charge transferring stages, which operate as a barrier region or an electric charge accumulating region according to a level of the applied voltage, are formed out of a portion in which the electrode set D1 and the electrode set D2 are overlapped on each other.

To each electric charge transferring stage of the horizontal electric charge transfer passage 2, each of the two vertical electric charge transfer passages 1 adjacent to each other is connected through the electric charge accumulating region 5. In an upper portion of the electric charge accumulating region 5 located on the upstream side (on the right side in the drawing) in the electric charge transferring direction of the horizontal electric charge transfer passage 2 in the two electric charge accumulating regions 5 connected to each electric charge transferring stage, the memory electrode 3a, upon which the line memory pulse φLM1 is applied, is formed. In an upper portion of the electric charge accumulating region 5 located on the downstream side (on the left side in the drawing) in the electric charge transferring direction of the horizontal electric charge transfer passage 2, the memory electrode 3b, upon which the line memory pulse φLM2 is applied, is formed. The line memory pulses φLM1 and φLM2 can be respectively put into the states of the high level and the low level.

Figure 2:
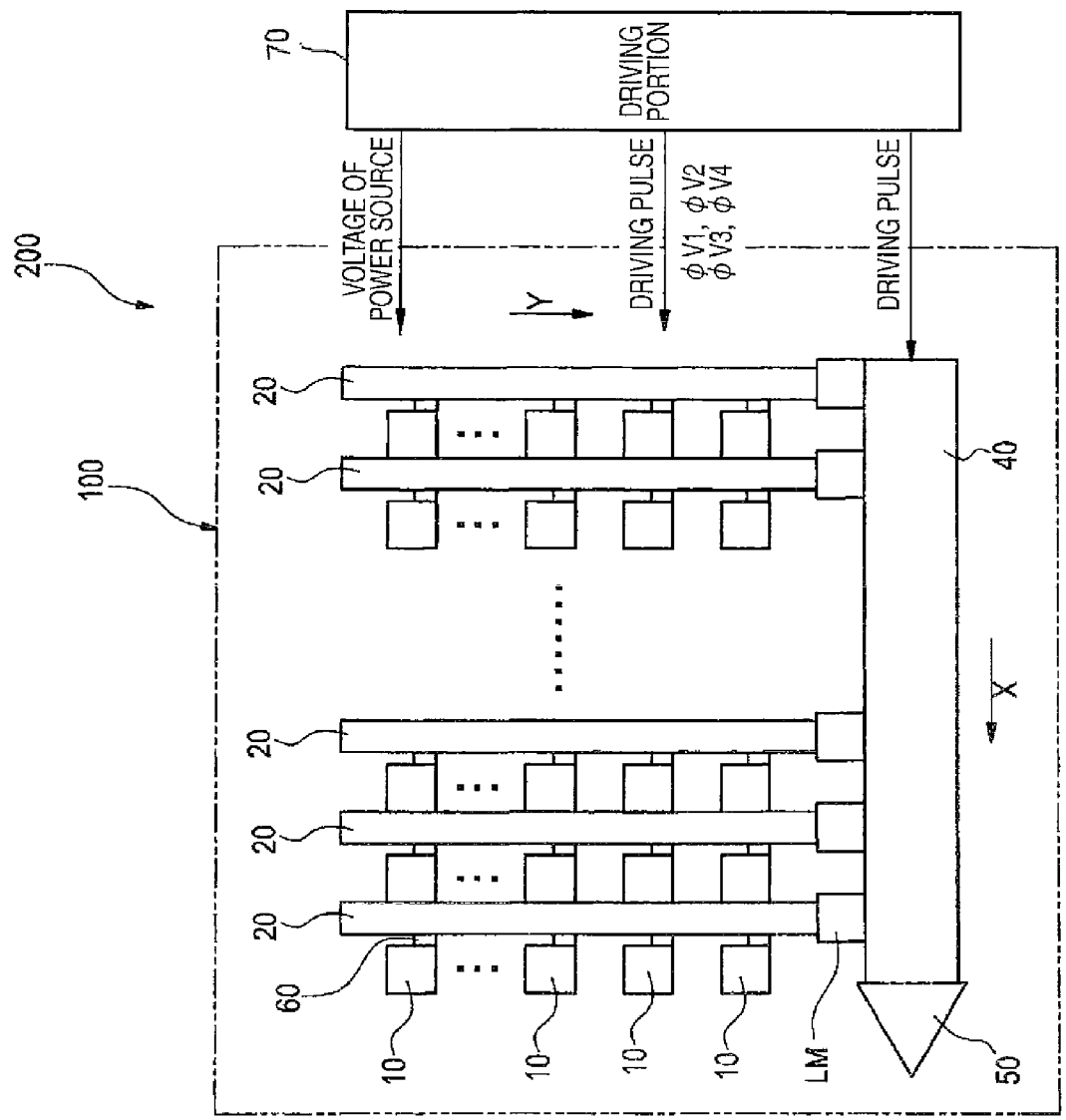
FIG. 2 is a schematic plan view showing an example of the entire constitution of the solid imaging element of the first embodiment.
Figure 3:
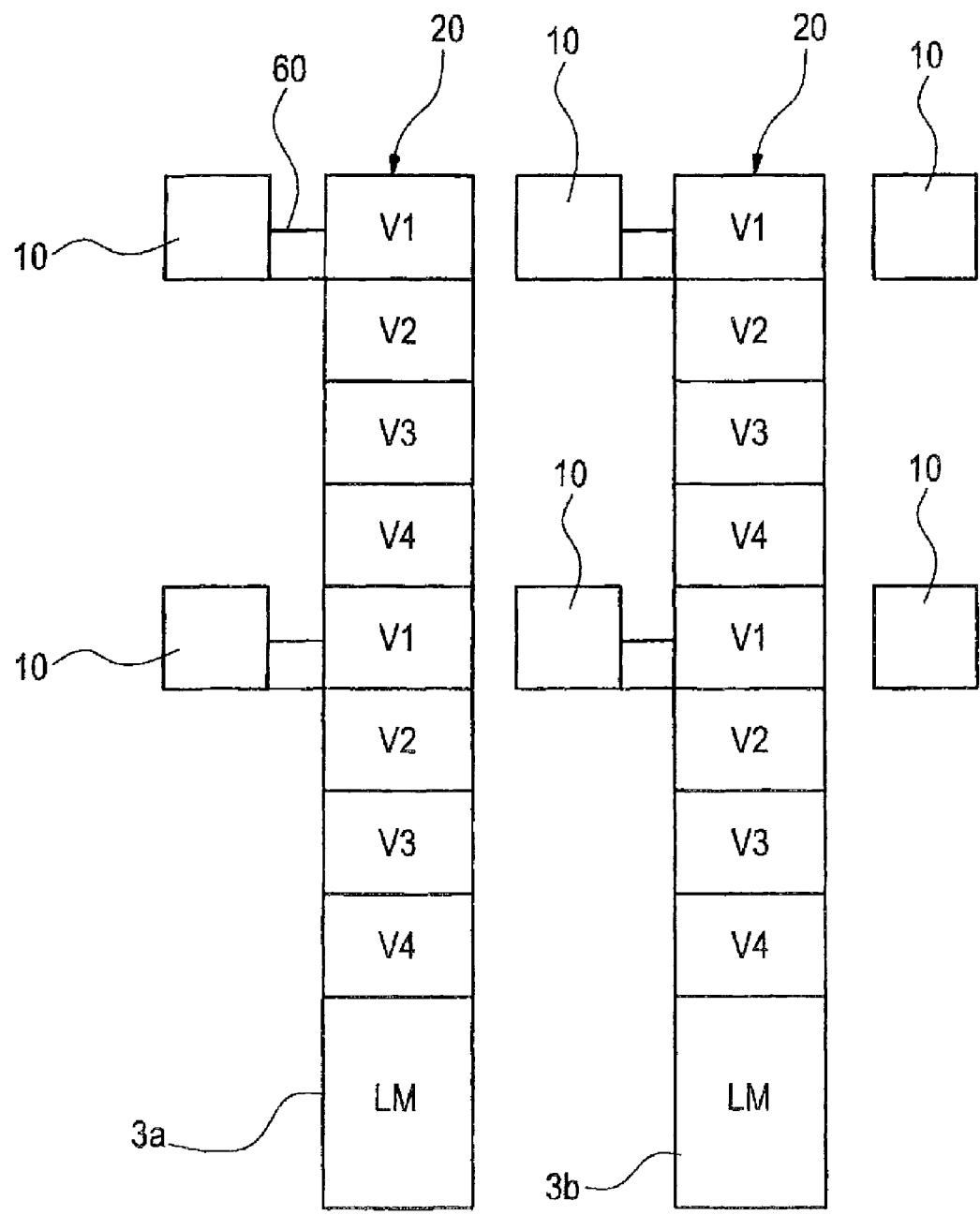
FIG. 3 is a partially enlarged view of the solid state imaging element shown in FIG. 2.

FIG. 2 is a schematic plan view showing an example of the entire constitution of the solid imaging element of the first embodiment. FIG. 3 is a partially enlarged view of the solid state imaging element shown in FIG. 2.

The solid state imaging element 100 shown in FIG. 2 includes a large number of photoelectric conversion elements 10 arranged in a square-lattice-shape in the vertical direction Y and the horizontal direction X. On the side of a row of the photoelectric conversion elements formed out of the photoelectric conversion elements arranged in the vertical direction Y, the vertical electric charge transfer passage 1 and the vertical electric charge transferring device 20, which is formed out of the transferring electrodes V1 to V4 arranged above the vertical electric charge transfer passage 1, are correspondingly provided. Between the photoelectric conversion elements 10 composing the photoelectric conversion element row and the vertical electric charge transfer passage 1 corresponding to the photoelectric conversion element row concerned, the electric charge reading portion 60 is provided which reads out the electric charges accumulated in the photoelectric conversion element 10 to the vertical electric charge transfer passage 1 concerned.

To an end portion of the vertical electric charge transferring device 20, the line memory LM, which is formed out of the electric charge accumulating region 5 and the memory electrodes 3a, 3b, is connected. To this line memory LM, the horizontal electric charge transferring device 40, which is formed out of the horizontal electric charge transfer passage 2 and the electrodes 4a, 4b, is connected. To the horizontal electric charge transferring device 40, the output portion 50 is connected which outputs a signal according to the electric charge transferred in the horizontal electric charge transfer passage 2.

The drive portion 70 is provided in the image pickup device 200 on which the solid state imaging element is mounted. This drive portion 70 supplies the transferring pulses φV1 to φV4 to the transferring electrodes V1 to V4 of the vertical electric charge transferring device 20. The drive portion 70 also supplies the transferring pulses φH1 to φH2 to the electrode sets D1 and D2 of the horizontal electric charge transferring device 40, so that the solid state imaging element 100 can be driven.

Figure 4:
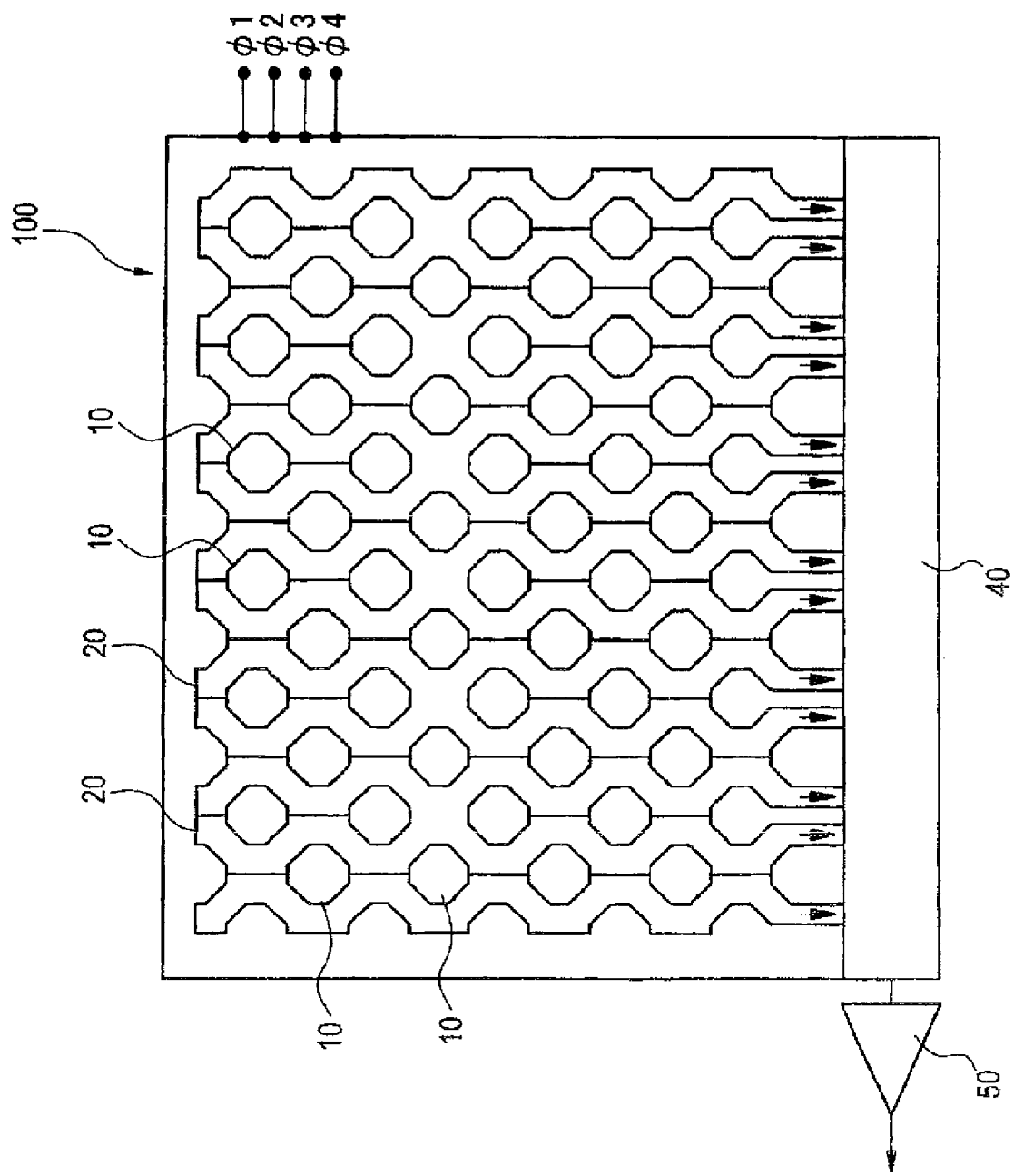
FIG. 4 is a schematic plan view showing another example of the entire constitution of the solid imaging element of the first embodiment.
Figure 5:
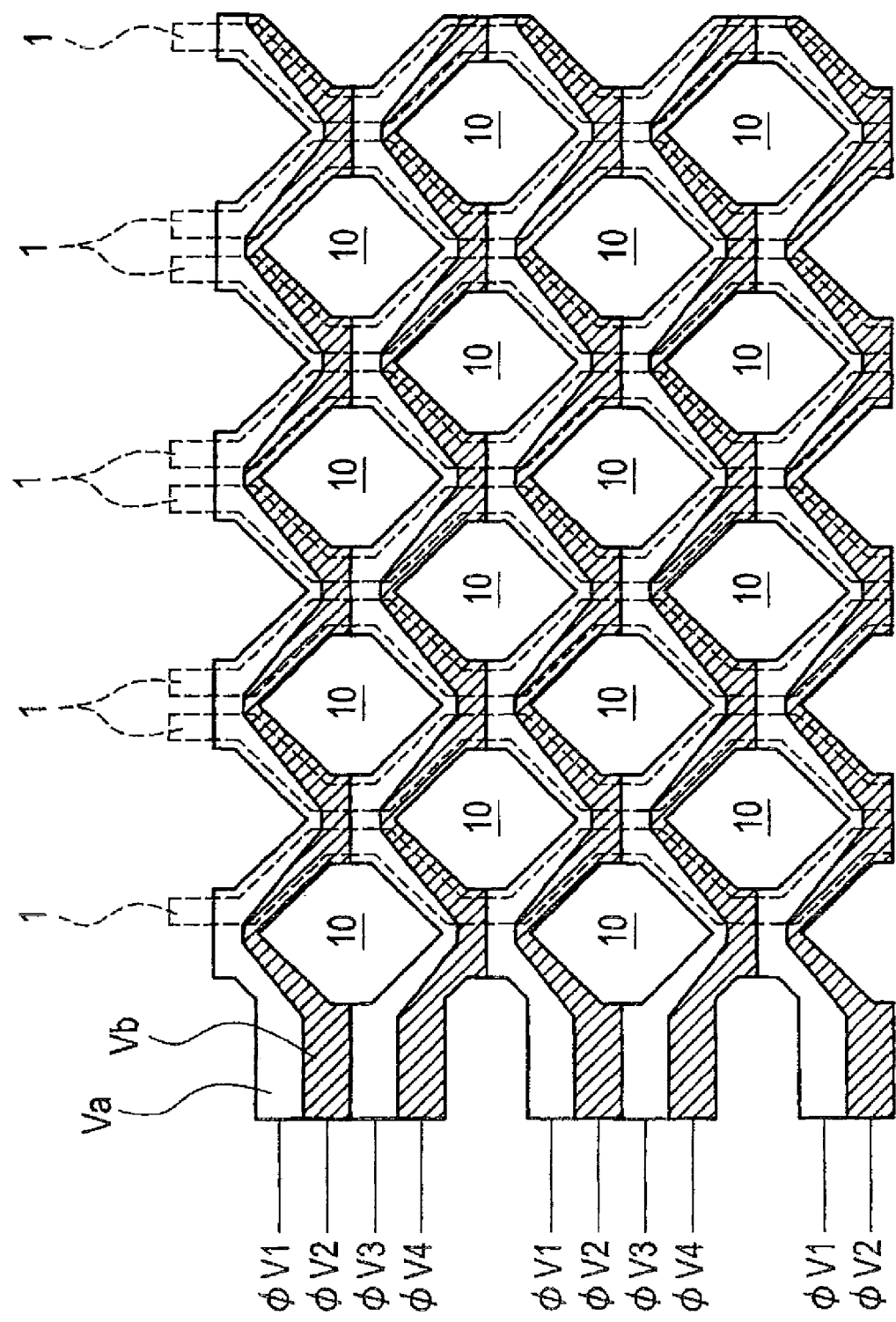
FIG. 5 is a partially enlarged view of the solid state imaging element shown in FIG. 4.

FIG. 4 is a schematic plan view showing another example of the entire constitution of the solid imaging element of the first embodiment. FIG. 5 is a partially enlarged view of the solid state imaging element shown in FIG. 4.

Different points between the solid state imaging element 100 shown in FIG. 4 and the solid state imaging element 100 shown in FIG. 2 are an arrangement of the photoelectric conversion elements 10 and a shape of the vertical electric charge transferring device 20.

The solid state imaging element 100 shown in FIG. 4 is composed in such a manner that the first photoelectric conversion element group, in which the photoelectric conversion elements 10 are arranged in a square-lattice-shape in the vertical direction Y and the horizontal direction X, and the second photoelectric conversion element group, in which the photoelectric conversion elements 10 are arranged in a square-lattice-shape in the vertical direction Y and the horizontal direction X, are shifted in the vertical direction Y and the horizontal direction X by ½ of the arrangement pitch of the photoelectric conversion elements 10 of each photoelectric conversion element group. The vertical electric charge transferring device 20 is formed being snaked in the vertical direction Y between the rows of the photoelectric conversion elements composed of the photoelectric conversion elements 10 arranged in the vertical direction Y so that the vertical electric charge transferring device 20 can evade the photoelectric conversion element 10.

As shown in FIG. 5, the vertical electric charge transferring device 20 is formed out of the vertical electric charge transfer passage 1, the shape of which is snaking, and the transferring electrodes $V_a$, $V_b$, the shape of which is snaking, arranged in the vertical direction Y in an upper portion. To these transferring electrodes $V_a$, $V_b$, the 4-phase transferring pulses φV1 to φV4 are supplied from a drive portion not shown in the drawing. Due to the foregoing, the electric charge transferring operation of the vertical electric charge transferring device 20 is controlled.

The solid state imaging element of the present embodiment includes three types of photoelectric conversion elements for detecting light of the different wavelength regions. Examples of the three types of photoelectric conversion elements are: an R-photoelectric conversion element for detecting light of the wave-length region of red (R); a G-photoelectric conversion element for detecting light of the wave-length region of green (G); and a B-photoelectric conversion element for detecting light of the wave-length region of blue (B). An arrangement of the three types of photoelectric conversion elements is determined so that the third color component (component C) can be interposed between the first color component (component R) and the second color component (component B) under the condition that electric charges are accumulated in all the electric charge accumulating regions 5.

Figure 6A:
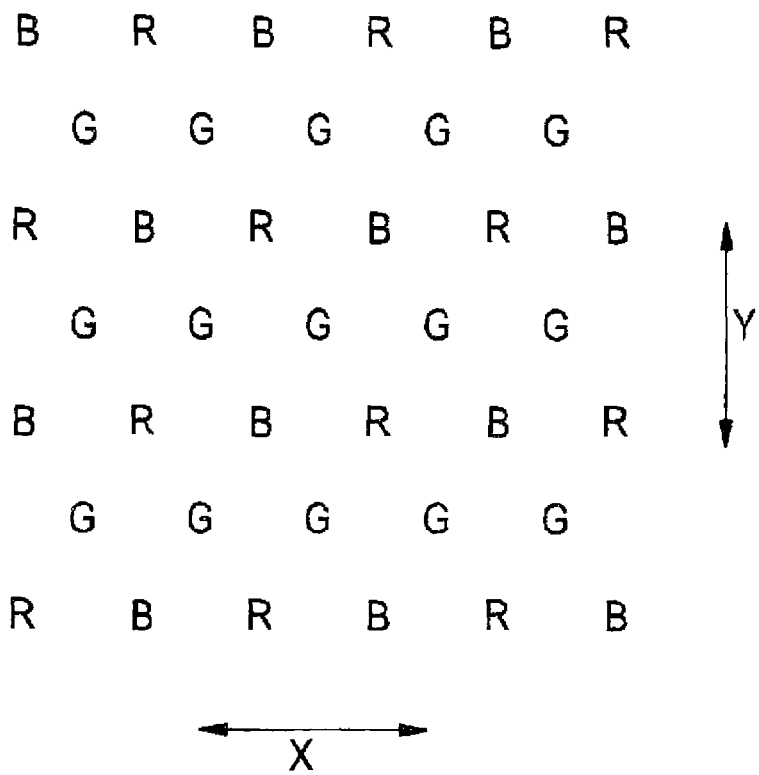
FIGS. 6A and 6B are views showing an example of the arrangement of the photoelectric conversion element of the solid state imaging element of the first embodiment.
Figure 6B:
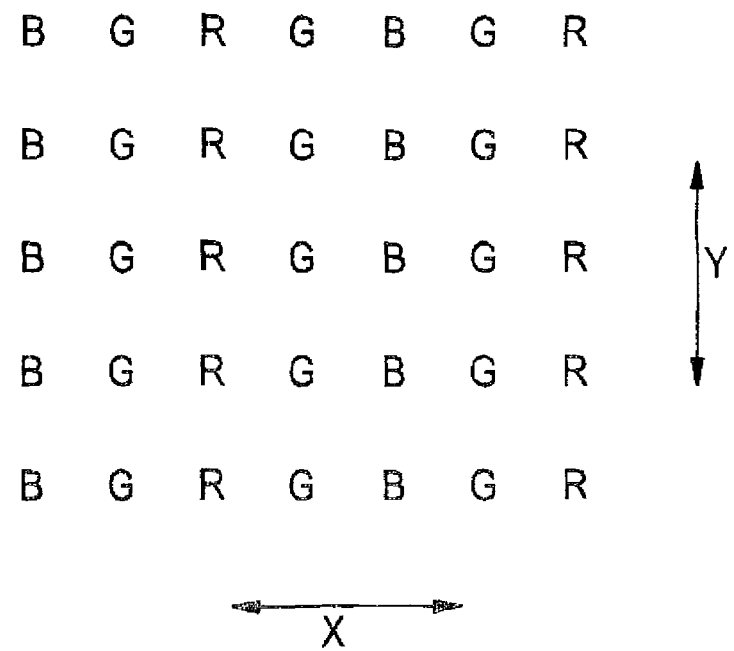

FIGS. 6A and 6B are views showing an example of the arrangement of the photoelectric conversion element of the solid state imaging element of the first embodiment. In FIGS. 6A and 6B, "R" is an R-photoelectric conversion element, "G" is a G-photoelectric conversion element and "B" is a B-photoelectric conversion element.

FIG. 6A shows examples of the arrangements of the R-photoelectric conversion element, the G-photoelectric conversion element and the B-photoelectric conversion element in the solid state imaging element 100 shown in FIG. 4. The first photoelectric conversion element group arranged in a square-lattice-shape is composed of the R-photoelectric conversion element and B-photoelectric conversion element. The second photoelectric conversion element group arranged in a square-lattice-shape is composed of the G-photoelectric conversion element. An arrangement of the photoelectric conversion elements in the first photoelectric conversion element group is a checkered pattern of the R-photoelectric conversion elements and the B-photoelectric conversion elements.

According to this arrangement, under the condition that electric charges are accumulated in all the electric charge accumulating regions 5, that is, under the condition that electric charges from the photoelectric conversion elements of two lines are accumulated in the electric charge accumulating region 5, an arrangement of the color components of the electric charges is RGBGRGBG . . . or BGRGBGRG . . . . Therefore, R electric charges and B electric charges are alternately arranged in the horizontal direction X while G electric charges are being interposed between them. Therefore, the above arrangement condition can be satisfied.

FIG. 6B is a view showing an example in which R photoelectric conversion elements, G photoelectric conversion elements and B photoelectric conversion elements are arranged in the solid state imaging element 100 shown in FIG. 2. A row of the B photoelectric conversion elements composed of the B photoelectric conversion elements arranged in the vertical direction Y and a row of the R photoelectric conversion elements composed of the R photoelectric conversion elements arranged in the vertical direction Y are alternately arranged in the horizontal direction X while a row of the G photoelectric conversion elements are interposed between them.

According to this arrangement, under the condition that electric charges are accumulated in all the electric charge accumulating regions 5, that is, under the condition that electric charges from the photoelectric conversion elements of one line are accumulated in the electric charge accumulating region 5, an arrangement of the color components of the electric charges is RGBGRGBG . . . or BGRGBGRG . . . . Therefore, R electric charges and B electric charges are alternately arranged in the horizontal direction X while G electric charges are being interposed between them. Therefore, the above arrangement condition can be satisfied.

In this connection, FIGS. 6A and 6B show an arrangement of photoelectric conversion elements for detecting light of original colors. However, it is possible to employ an arrangement of photoelectric conversion elements for detecting light of additive complementary colors.

Operation of the solid state imaging element composed as described above will be explained below.

FIGS. 7A to 7E are diagrams for explaining operation of electric charge transmission from the line memory of the solid state imaging element shown in FIG. 1 to the horizontal electric charge transfer passage. In FIGS. 7A to 7E, timing charts of the transferring pulses φH1, φH2 and the line memory pulses φLM1, φLM2 are shown on the left side and the circumstances of electric charges at the timing shown on the left side are shown on the right side. In this case, explanations will be made into an example in which the photoelectric conversion elements included in the solid state imaging element are arranged as shown in FIGS. 6A and 6B.

FIG. 7A shows a state in which electric charges obtained from the photoelectric conversion elements of two lines of solid state imaging elements are accumulated in the large number of electric charge accumulating region 5. In this state, of the transferring pulses φH1, φH2 are on the low level and the line memory pulses φLM1, φLM2 are on the high level. An electric potential well is formed in the electric charge accumulating region 5 and each electric charge transferring stage of the horizontal electric charge transfer passage 2 forms a barrier of this electric potential well.

Next, as shown in FIG. 7B, φLM2 is made to be on the low level and φH2 is made to be on the high level and the electric charge "R" in the electric charge accumulating region 5 below the memory electrode 3b corresponding to this electric charge transferring stage is moved to the electric charge transferring stage below the electrode set D1. After that, φH2 is made to be on the low level and φH1 is made to be on the high level. Then, the electric charge "R" is transferred to the adjoining electric charge transferring stage. When this transferring operation is repeated, a signal corresponding to the electric charge "R" is outputted from an output amplifier connected to an end portion of the horizontal electric charge transfer passage 2.

After the signal corresponding to the electric charge "R" has been outputted, φLM2, φLM1, φH1 and φH2 are made into a state shown in FIG. 7A. Then, as shown in FIG. 7C, φLM1 is made on the low level and φH2 is made on the high level and the electric charge "G1" in the electric charge accumulating region 5 below the memory electrode 3a corresponding to this electric charge transferring stage is moved to the electric charge transferring stage below the electrode set D1. After that, φH2 is made on the low level and φH1 is made on the high level. Then, the electric charge "G1" is transferred to the adjoining electric charge transferring stage. When this transferring operation is repeated, a signal corresponding to the electric charge "G1" is outputted from an output amplifier connected to an end portion of the horizontal electric charge transfer passage 2.

After the signal corresponding to the electric charge "G1" has been outputted, φLM2, φLM1, φH1 and φH2 are made into a state shown in FIG. 7A. Then, as shown in FIG. 7D, φLM2 is made on the low level and φH1 is made on the high level and the electric charge "B" in the electric charge accumulating region 5 below the memory electrode 3b corresponding to this electric charge transferring stage is moved to the electric charge transferring stage below the electrode set D2. After that, φH1 is made on the low level and φH2 is made on the high level. Then, the electric charge "B" is transferred to the adjoining electric charge transferring stage. When this transferring operation is repeated, a signal corresponding to the electric charge "B" is outputted from an output amplifier connected to an end portion of the horizontal electric charge transfer passage 2.

After the signal corresponding to the electric charge "B" has been outputted, φLM2, φLM1, φH1 and φH2 are made into a state shown in FIG. 7A. Then, as shown in FIG. 7E, φLM1 is made on the low level and φH1 is made on the high level and the electric charge "G2" in the electric charge accumulating region 5 below the memory electrode 3a corresponding to this electric charge transferring stage is moved to the electric charge transferring stage below the electrode set D2. After that, φH1 is made on the low level and φH2 is made on the high level. Then, the electric charge "G2" is transferred to the adjoining electric charge transferring stage. When this transferring operation is repeated, a signal corresponding to the electric charge "G2" is outputted from an output amplifier connected to an end portion of the horizontal electric charge transfer passage 2.

By this operation, the electric charges of two lines have been transferred.

As described above, according to the solid state imaging element of the present embodiment, two vertical electric charge transfer passages 1 are connected to one electric charge transferring stage. Then, the memory electrodes 3a, 3b above the electric charge accumulating region 5 connected to the two vertical electric charge transfer passage 1 are respectively independently applied with voltage. Due to the foregoing, it is possible to select electric charges to be transferred to the horizontal electric charge transfer passage 2 by the line memory LM.

Figure 29:
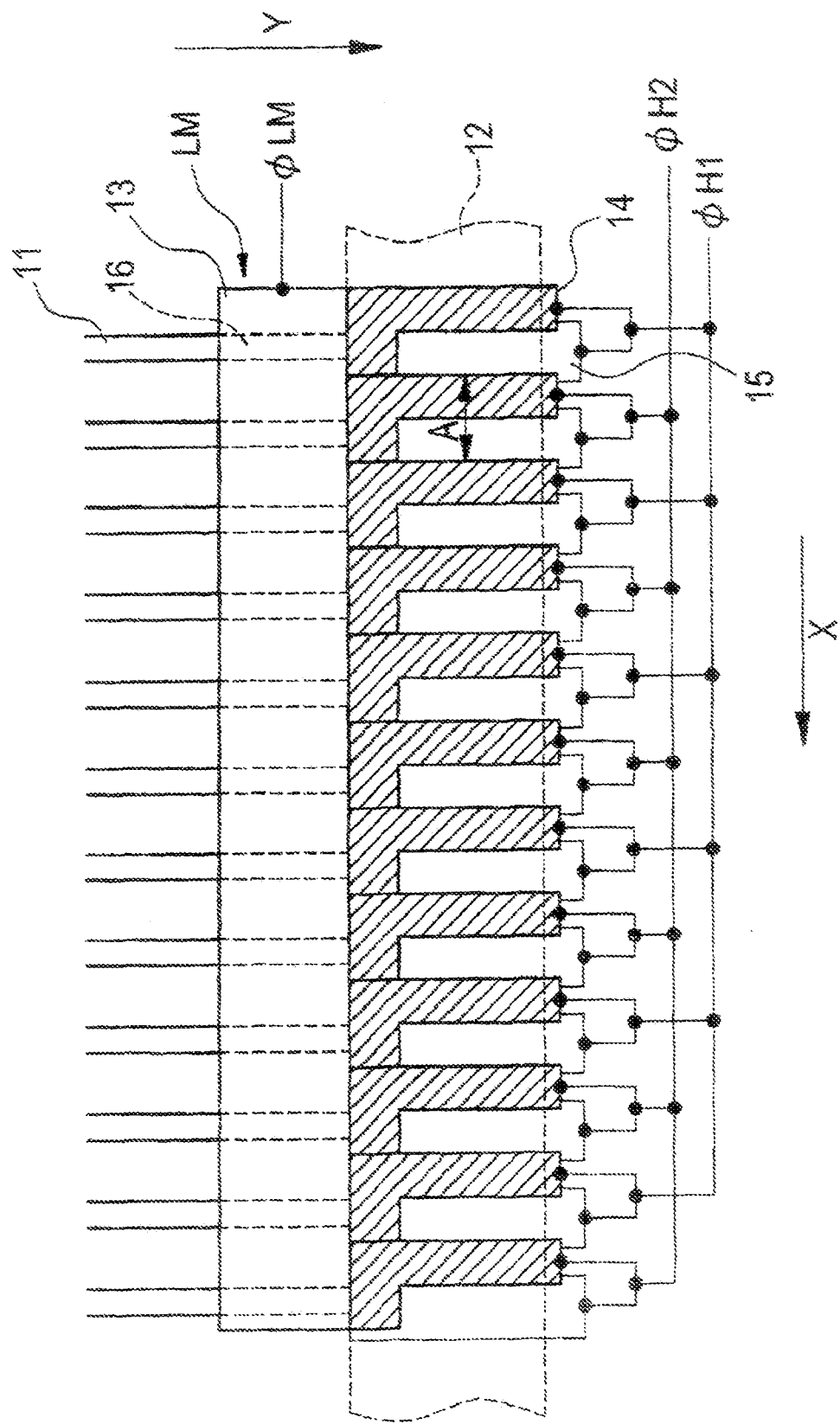
FIG. 29 is a partial enlarged view showing a commonly used solid state imaging element.

Therefore, even in the case where the same pixel pitch as that of FIG. 29 is realized, while a width in the horizontal direction of the horizontal electric charge transfer passage 2 is being maintained, the width (A' shown in FIG. 1) in the horizontal direction of the electric charge transferring stage can be expanded larger than the width shown in FIG. 29. As a result, the electric charge transferring capacity of the horizontal electric charge transfer passage 2 can be increased without increasing the electric power consumption. Further, since it is possible to reduce the number of the electric charge transferring stages, the deterioration of the transmission efficiency can be prevented.

According to the solid state imaging element of the present embodiment, the memory electrode of the line memory LM is divided into the memory electrodes 3a and 3b upon which voltage can be respectively independently applied. Therefore, when the line memory pulses φLM1, φLM2 are controlled, the electric charges can be distributed from the line memory LM to the horizontal electric charge transfer passage 2.

In the case where multiple-field-reading is executed by the constitution shown in FIG. 29, the drive of the vertical electric charge transfer passage 11 becomes complicated. However, according to the constitution shown in FIG. 1, without making the drive of the vertical electric charge transfer passage 1 complicated, the multiple-field-reading can be realized only by controlling the line memory pulses φLM1, φLM2. Therefore, the thinned-out operation can be easily realized when the line memory pulses φLM1, φLM2 are controlled. As described above, when a plurality of types of memory electrodes are provided, various driving methods can be easily realized.

In this connection, in the above explanations, two vertical electrode transfer passages 1 are connected to the electric charge transferring stages of the horizontal electric charge transfer passage 2. However, even when the number of the vertical electric charge transfer passages 1 connected to the electric charge transferring stages is three or more, the effects described above can be obtained. The following explanations will be made into a case in which the number of the vertical electric charge transfer passages 1 connected to the electric charge transferring stages is four.

Figure 8:
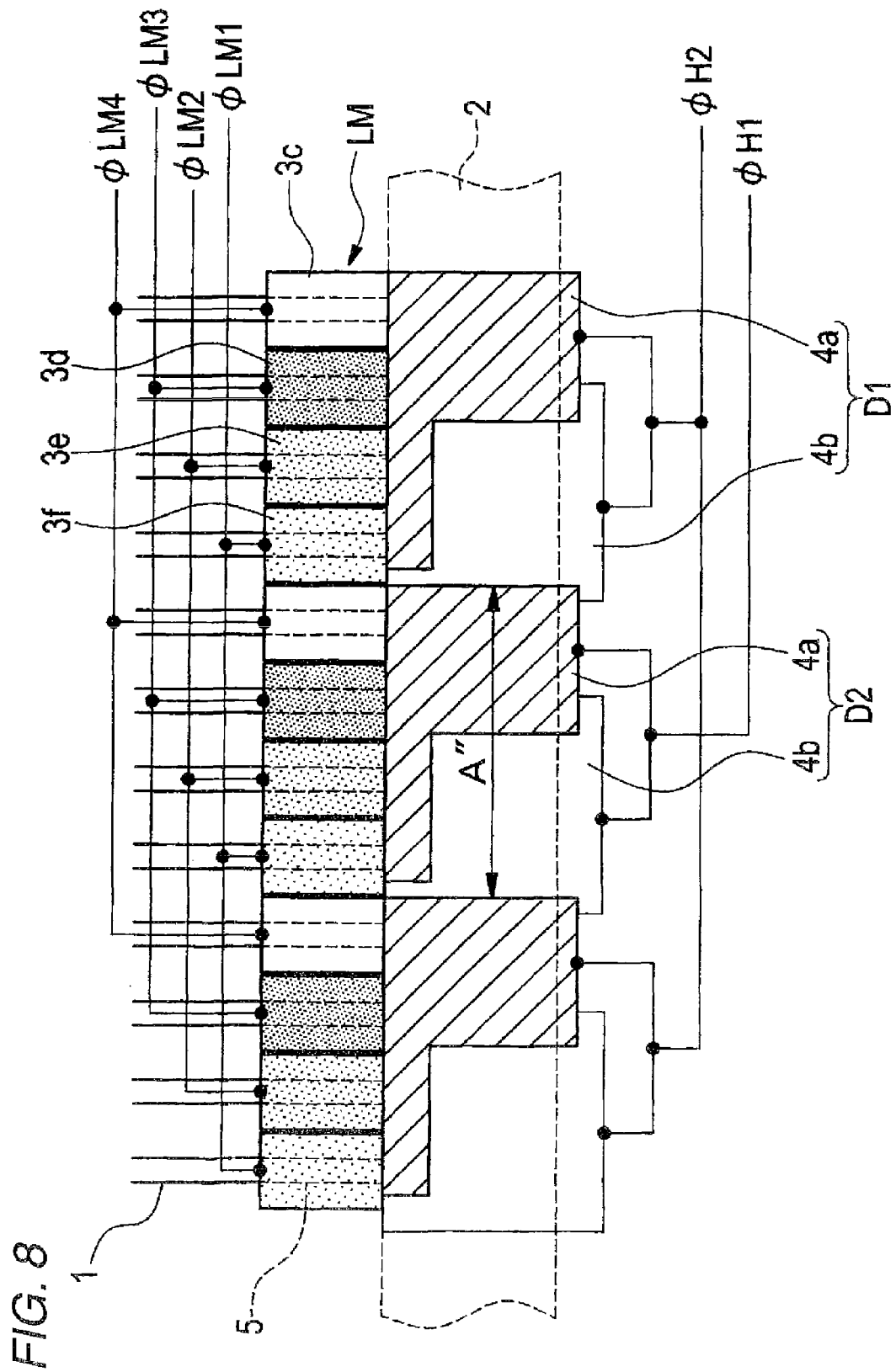
FIG. 8 is a partial schematic plan view showing an outline of the constitution of the solid state imaging element of a variation of the first embodiment of the present invention.

FIG. 8 is a partial schematic plan view showing an outline of the constitution of the solid state imaging element of a variation of the first embodiment of the present invention. Like reference marks are used to indicate like components in FIGS. 1 and 8.

Different points between the solid state imaging element shown in FIG. 8 and the solid state imaging element shown in FIG. 1 are that four vertical electric charge transfer passages 1 are connected to the electric charge transferring stage of the horizontal electric charge transfer passage 2.

As shown in FIG. 8, to the electric charge transferring stage of the horizontal electric charge transfer passage 2, four vertical electric charge transfer passages 1 are connected through the electric charge accumulating region 5. In an upper portion of the electric charge accumulating region 5 located on the most downstream side (on the most left side in FIG. 8) in the electric charge transferring direction by the horizontal electric charge transfer passage 2 in the four electric charge accumulating regions 5 connected to each of the four vertical electric charge transfer passages 1, the memory electrode 3f, upon which the line memory pulse φLM1 is applied, is formed. In an upper portion of the electric charge accumulating region 5, which is the second from the left in FIG. 8, the memory electrode 3e, upon which the line memory pulse φLM2 is applied, is formed. In an upper portion of the electric charge accumulating region 5, which is the third from the left in FIG. 8, the memory electrode 3d, upon which the line memory pulse φLM3 is applied, is formed. In an upper portion of the electric charge accumulating region 5, which is the fourth from the left in FIG. 8, the memory electrode 3c, upon which the line memory pulse φLM4 is applied, is formed. The line memory pulses φLM1 to φLM4 can be respectively put into the states of the high level and the low level.

Operation of the solid state imaging element composed as described above will be explained as follows.

Figure 9:
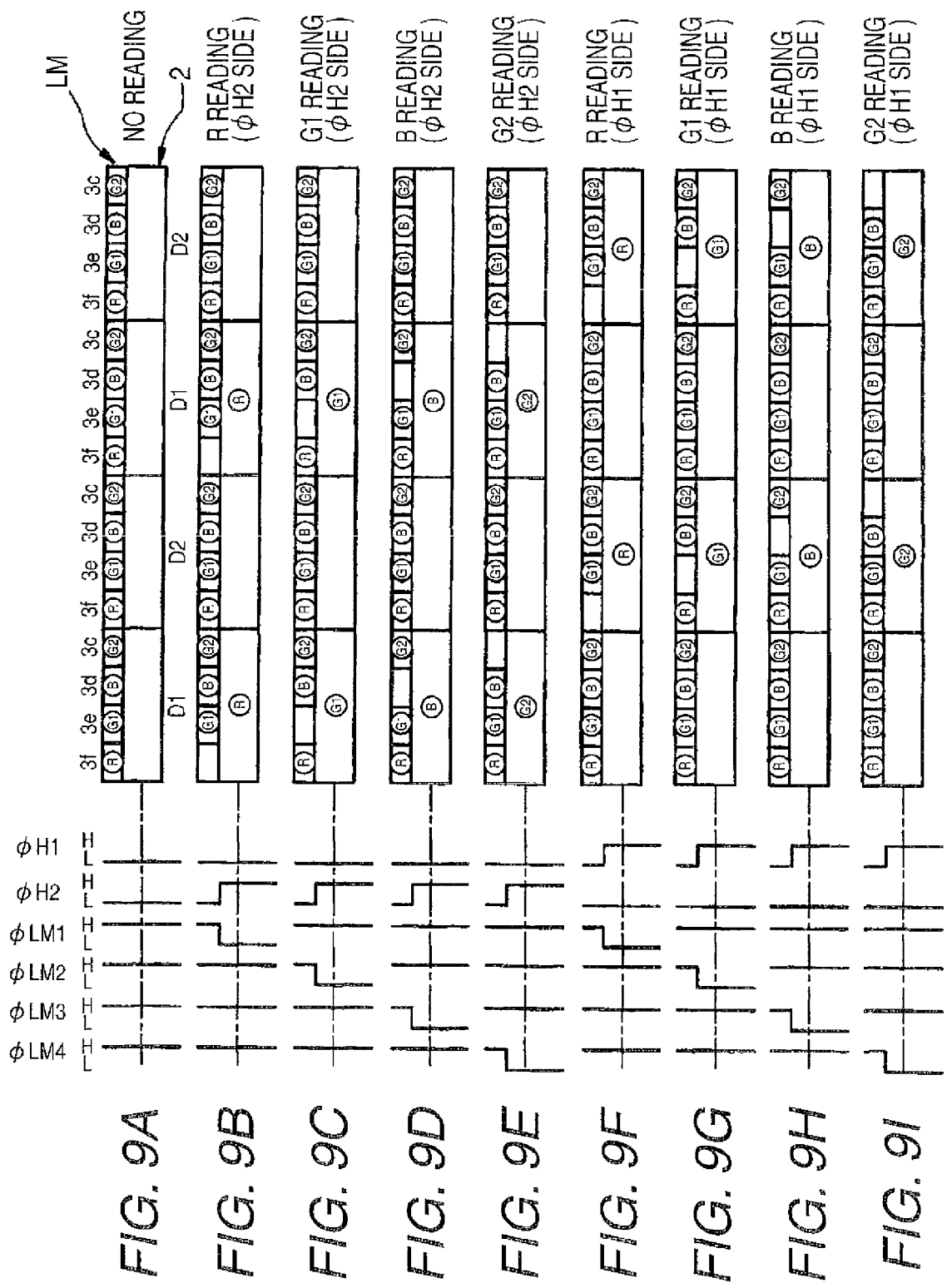
FIGS. 9A to 9I are diagrams for explaining operation of electric charge transmission from the line memory of the solid state imaging element shown in FIG. 8 to the horizontal electric charge transfer passage.

FIG. 9 is a diagram for explaining operation of electric charge transmission from the line memory of the solid state imaging element shown in FIG. 8 to the horizontal electric charge transfer passage. In FIG. 9, timing charts of the transferring pulses φH1, φH2 and the line memory pulses φLM1 to φLM4 are shown on the left side and the circumstances of electric charges at the timing shown on the left side are shown on the right side. In this case, explanations will be made into an example in which the photoelectric conversion elements included in the solid state imaging element are arranged as shown in FIGS. 6A and 6B.

FIG. 9A shows a state in which electric charges obtained from the photoelectric conversion elements of two lines of solid state imaging elements are accumulated in the large number of electric charge accumulating regions 5. In this state, the transferring pulses φH1, φH2 are on the low level and the line memory pulses φLM1 to φLM4 are on the high level. An electric potential well is formed in the electric charge accumulating region 5 and each electric charge transferring stage of the horizontal electric charge transfer passage 2 forms a barrier of this electric potential well.

Next, as shown in FIG. 9B, φLM1 is made to be on the low level and φH2 is made to be on the high level and the electric charge "R" in the electric charge accumulating region 5 below the memory electrode 3f corresponding to this electric charge transferring stage is moved to the electric charge transferring stage below the electrode set D1. After that, φH2 is made to be on the low level and φH1 is made to be on the high level. Then, the electric charge "R" is transferred to the adjoining electric charge transferring stage. When this transferring operation is repeated, a signal corresponding to the electric charge "R" is outputted from an output amplifier connected to an end portion of the horizontal electric charge transfer passage 2.

After the signal corresponding to the electric charge "R" has been outputted, φLM1 to φLM4, φH1 and φH2 are made into a state shown in FIG. 9A. Then, as shown in FIG. 9C, φLM2 is made on the low level and φH2 is made on the high level and the electric charge "G1" in the electric charge accumulating region 5 below the memory electrode 3e corresponding to this electric charge transferring stage is moved to the electric charge transferring stage below the electrode set D1. After that, φH2 is made on the low level and φH1 is made on the high level. Then, the electric charge "G1" is transferred to the adjoining electric charge transferring stage. When this transferring operation is repeated, a signal corresponding to the electric charge "G1" is outputted from an output amplifier connected to the end portion of the horizontal electric charge transfer passage 2.

After the signal corresponding to the electric charge "G1" has been outputted, φLM1 to φLM4, φH1 and φH2 are made into a state shown in FIG. 9A. Then, as shown in FIG. 9D, φLM3 is made on the low level and φH2 is made on the high level and the electric charge "B" in the electric charge accumulating region 5 below the memory electrode 3d corresponding to this electric charge transferring stage is moved to the electric charge transferring stage below the electrode set D1. After that, φH2 is made to be on the low level and φH1 is made to be on the high level. Then, the electric charge "B" is transferred to the adjoining electric charge transferring stage. When this transferring operation is repeated, a signal corresponding to the electric charge "B" is outputted from an output amplifier connected to the end portion of the horizontal electric charge transfer passage 2.

After the signal corresponding to the electric charge "B" has been outputted, φLM1 to φLM4, φH1 and φH2 are made into a state shown in FIG. 9A. Then, as shown in FIG. 9E, φLM4 is made on the low level and φH2 is made on the high level and the electric charge "G2" in the electric charge accumulating region 5 below the memory electrode 3c corresponding to this electric charge transferring stage is moved to the electric charge transferring stage below the electrode set D1. After that, φH2 is made to be on the low level and φH1 is made to be on the high level. Then, the electric charge "G2" is transferred to the adjoining electric charge transferring stage. When this transferring operation is repeated, a signal corresponding to the electric charge "G2" is outputted from an output amplifier connected to the end portion of the horizontal electric charge transfer passage 2.

After the signal corresponding to the electric charge "G2" has been outputted, φLM1 to φLM4, φH1 and φH2 are made into a state shown in FIG. 9A. Then, as shown in FIG. 9F, φLM1 is made on the low level and φH1 is made on the high level and the electric charge "R" in the electric charge accumulating region 5 below the memory electrode 3f corresponding to this electric charge transferring stage is moved to the electric charge transferring stage below the electrode set D2. After that, φH1 is made on the low level and φH2 is made on the high level. Then, the electric charge "R" is transferred to the adjoining electric charge transferring stage. When this transferring operation is repeated, a signal corresponding to the electric charge "R" is outputted from an output amplifier connected to the end portion of the horizontal electric charge transfer passage 2.

After the signal corresponding to the electric charge "R" has been outputted, φLM1 to φLM4, φH1 and φH2 are made into a state shown in FIG. 9A. Then, as shown in FIG. 9G, φLM2 is made on the low level and φH1 is made on the high level and the electric charge "G1" in the electric charge accumulating region 5 below the memory electrode 3e corresponding to this electric charge transferring stage is moved to the electric charge transferring stage below the electrode set D2. After that, φH1 is made on the low level and φH2 is made on the high level. Then, the electric charge "G1" is transferred to the adjoining electric charge transferring stage. When this transferring operation is repeated, a signal corresponding to the electric charge "G1" is outputted from an output amplifier connected to the end portion of the horizontal electric charge transfer passage 2.

After the signal corresponding to the electric charge "G1" has been outputted, φLM1 to φLM4, φH1 and φH2 are made into a state shown in FIG. 9A. Then, as shown in FIG. 9H, φLM3 is made on the low level and φH1 is made on the high level and the electric charge "B" in the electric charge accumulating region 5 below the memory electrode 3d corresponding to this electric charge transferring stage is moved to the electric charge transferring stage below the electrode set D2. After that, φH1 is made on the low level and φH2 is made on the high level. Then, the electric charge "B" is transferred to the adjoining electric charge transferring stage. When this transferring operation is repeated, a signal corresponding to the electric charge "B" is outputted from an output amplifier connected to the end portion of the horizontal electric charge transfer passage 2.

After the signal corresponding to the electric charge "B" has been outputted, φLM1 to φLM4, φH1 and φH2 are made into a state shown in FIG. 9A. Then, as shown in FIG. 9I, φLM4 is made on the low level and φH1 is made on the high level and the electric charge "G2" in the electric charge accumulating region 5 below the memory electrode 3c corresponding to this electric charge transferring stage is moved to the electric charge transferring stage below the electrode set D2. After that, φH1 is made to be on the low level and φH2 is made to be on the high level. Then, the electric charge "G2" is transferred to the adjoining electric charge transferring stage. When this transferring operation is repeated, a signal corresponding to the electric charge "G2" is outputted from an output amplifier connected to the end portion of the horizontal electric charge transfer passage 2.

When the above operation is executed, the transmission of electric charges corresponding to two lines is completed.

As described above, when four vertical electric charge transfer passages 1 are connected to the electric charge transferring stages of the horizontal electric charge transfer passage 2, the horizontal direction width A" of the electric charge transferring stage can be made to be twice as large as that of the solid stage imaging element of the first embodiment. Accordingly, the transferring capacity can be more increased. According to the constitution of the present embodiment, for example, when driving is completed at the point of time of FIG. 9E, the thinned-out reading in the horizontal direction can be realized.

Second Embodiment

Figure 10:
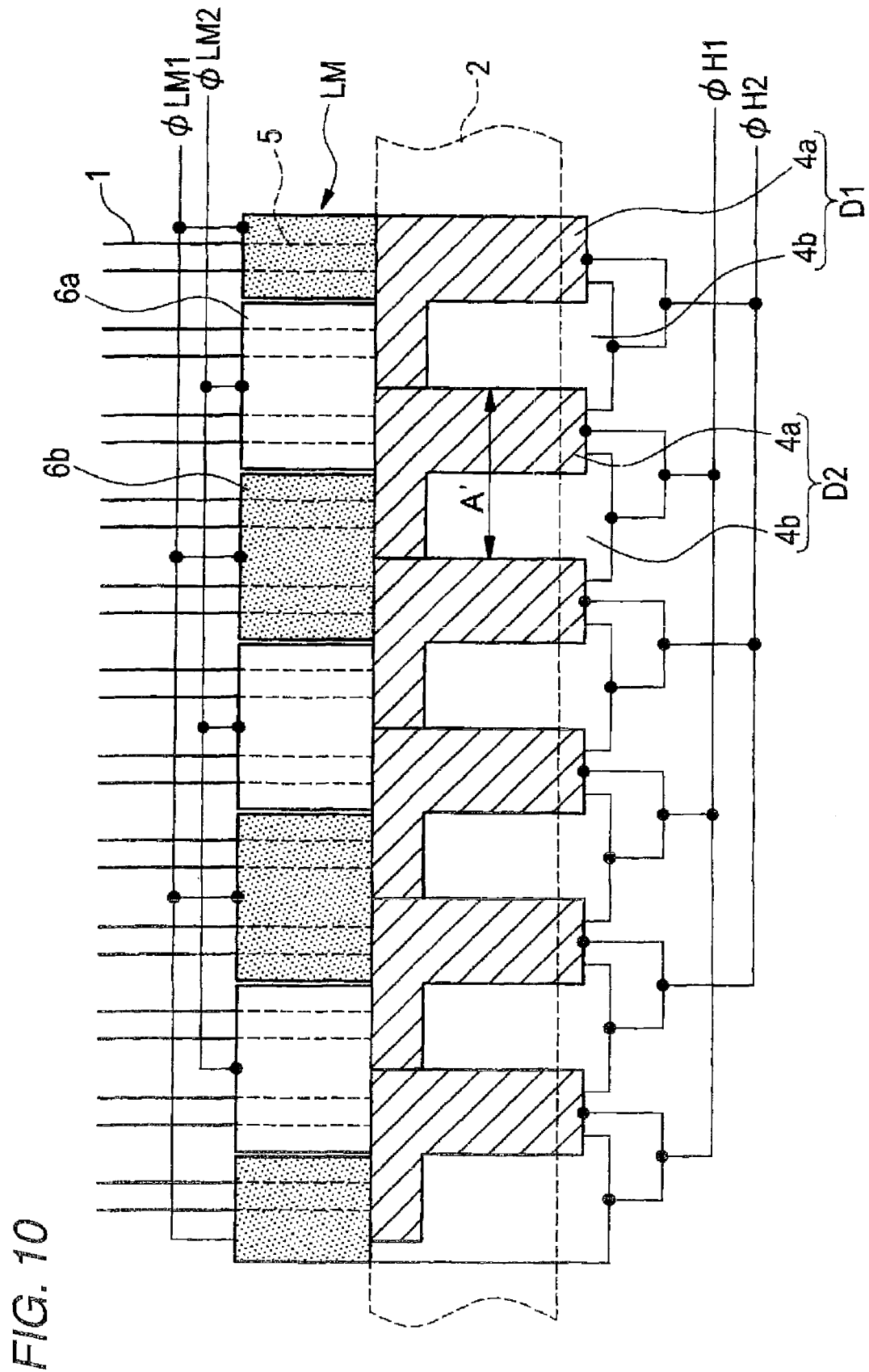
FIG. 10 is a partial schematic plan view showing an outline of the constitution of the solid state imaging element of the second embodiment of the present invention.

FIG. 10 is a partial schematic plan view showing an outline of the constitution of the solid state imaging element of the second embodiment of the present invention. Like reference marks are used to indicate like components in FIGS. 1 and 10.

The solid state imaging element shown in FIG. 10 is composed as follows. In the solid state imaging element shown in FIG. 1, the memory electrodes 3a, 3b, which are respectively connected to different electric charge transferring means and arranged above the two adjoining electric charge accumulating regions 5, are integrated into one body with each other.

As shown in FIG. 10, above the two adjoining electric charge accumulating region 5 respectively connected to the different electric charge transferring stages, the memory electrode 6a and the memory electrode 6b, which are respectively composed of one piece, for covering the two electric charge accumulating regions 5 are formed. The memory electrode 6a and the memory electrode 6b are alternately arranged in the horizontal direction X. The memory electrode 6a is applied with the line memory pulse φLM2 and the memory electrode 6b is applied with the line memory pulse φLM1. The line memory pulses φLM1 and φLM2 can be respectively put into the states of the high level and low level.

Operation of the solid state imaging element composed as described above will be explained below.

Figure 11:
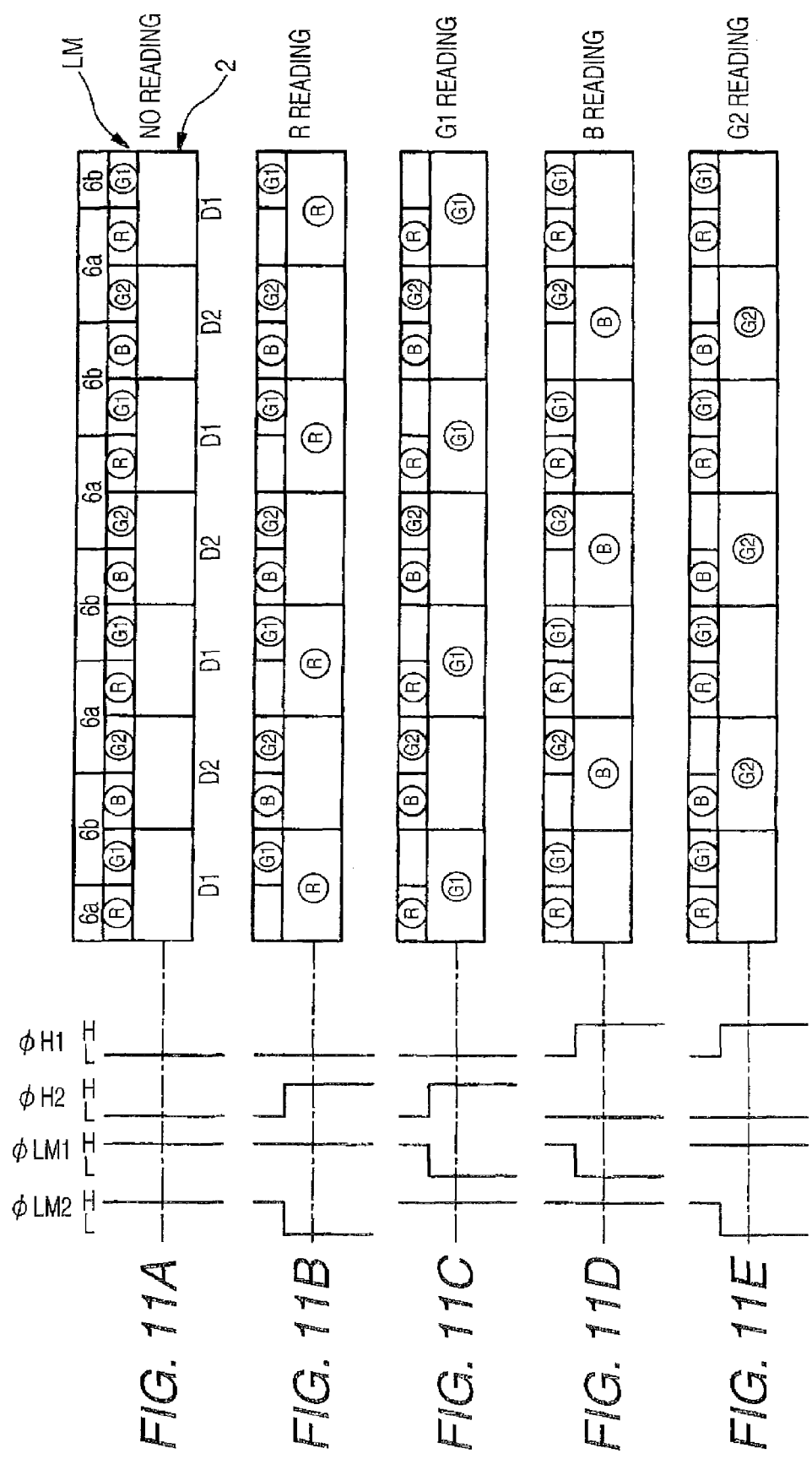
FIGS. 11A to 11E are diagrams for explaining operation of electric charge transmission from the line memory of the solid state imaging element shown in FIG. 10 to the horizontal electric charge transfer passage.

FIG. 11 is a diagram for explaining operation of electric charge transmission from the line memory of the solid state imaging element shown in FIG. 10 to the horizontal electric charge transfer passage. In FIG. 11, timing charts of the transferring pulses φH1, φH2 and the line memory pulses φLM1, φLM2 are shown on the left side and the circumstances of electric charges at the timing shown on the left side are shown on the right side. In this case, explanations will be made into an example in which the photoelectric conversion elements included in the solid state imaging element are arranged as shown in FIGS. 6A and 6B.

FIG. 11A shows a state in which electric charges obtained from the photoelectric conversion elements of two lines of solid state imaging elements are accumulated in the large number of electric charge accumulating region 5. In this state, of the transferring pulses φH1, φφH2 are on the low level and the line memory pulses φLM1, φLM2 are on the high level. An electric potential well is formed in the electric charge accumulating region 5 and each electric charge transferring stage of the horizontal electric charge transfer passage 2 forms a barrier of this electric potential well.

Next, as shown in FIG. 11B, φLM2 is made to be on the low level and φH2 is made to be on the high level and the electric charge "R" in the electric charge accumulating region 5 below the memory electrode 6a in the two electric charge accumulating regions 5 connected to the electric charge transferring stage is moved to the electric charge transferring stage below the electrode set D1. After that, φH2 is made to be on the low level and φH1 is made to be on the high level. Then, the electric charge "R" is transferred to the adjoining electric charge transferring stage. When this transferring operation is repeated, a signal corresponding to the electric charge "R" is outputted from an output amplifier connected to the end portion of the horizontal electric charge transfer passage 2.

After the signal corresponding to the electric charge "R" has been outputted, φLM2, φLM1, φH1 and φH2 are made into a state shown in FIG. 11A. Then, as shown in FIG. 11C, φLM1 is made on the low level and φH2 is made on the high level and the electric charge "G1" in the electric charge accumulating region 5 below the memory electrode 6b in the two electric charge accumulating regions 5 connected to the electric charge transferring stage is moved to the electric charge transferring stage below the electrode set D1. After that, φH2 is made on the low level and φH1 is made on the high level. Then, the electric charge "G1" is transferred to the adjoining electric charge transferring stage. When this transferring operation is repeated, a signal corresponding to the electric charge "G1" is outputted from an output amplifier connected to the end portion of the horizontal electric charge transfer passage 2.

After the signal corresponding to the electric charge "G1" has been outputted, φLM2, φLM1, φH1 and φH2 are made into a state shown in FIG. 11A. Then, as shown in FIG. 11D, φLM1 is made on the low level and φH1 is made on the high level and the electric charge "B" in the electric charge accumulating region 5 below the memory electrode 6b in the two electric charge accumulating region 5 connected to the electric charge transferring stage is moved to the electric charge transferring stage below the electrode set D2. After that, φH1 is made on the low level and φH2 is made on the high level.

Then, the electric charge "B" is transferred to the adjoining electric charge transferring stage. When this transferring operation is repeated, a signal corresponding to the electric charge "B" is outputted from an output amplifier connected to the end portion of the horizontal electric charge transfer passage 2.

After the signal corresponding to the electric charge "B" has been outputted, φLM2, φLM1, φH1 and φH2 are made into a state shown in FIG. 11A. Then, as shown in FIG. 11E, φLM2 is made on the low level and φH1 is made on the high level and the electric charge "G2" in the electric charge accumulating region 5 below the memory electrode 6a in the two electric charge accumulating regions 5 connected to this electric charge transferring stage is moved to the electric charge transferring stage below the electrode set D2. After that, φH1 is made on the low level and φH2 is made on the high level. Then, the electric charge "G2" is transferred to the adjoining electric charge transferring stage. When this transferring operation is repeated, a signal corresponding to the electric charge "G2" is outputted from an output amplifier connected to the end portion of the horizontal electric charge transfer passage 2.

By this operation, the electric charges of two lines have been transferred.

As described above, according to the solid state imaging element of the present embodiment, two vertical electric charge transfer passages 1 are connected to one electric charge transferring stage. Then, the memory electrodes 6a, 6b above the electric charge accumulating region 5 connected to the two vertical electric charge transfer passages 1 are respectively independently applied with voltage. Due to the foregoing, it is possible to select electric charges to be transferred to the horizontal electric charge transfer passage 2 by the line memory LM.

Therefore, even in the case where the same pixel pitch as that of FIG. 29 is realized, while a width in the horizontal direction of the horizontal electric charge transfer passage 2 is being maintained, the width (A' shown in FIG. 10) in the horizontal direction of the electric charge transferring stage can be expanded larger than the width shown in FIG. 29. As a result, the electric charge transferring capacity of the horizontal electric charge transfer passage 2 can be increased without increasing the electric power consumption. Further, since it is possible to reduce the number of the electric charge transferring stages, the deterioration of the transmission efficiency can be prevented.

According to the solid state imaging element of the present embodiment, as compared with the solid state imaging element shown in FIG. 1, the number of the memory electrodes can be reduced to a half. Accordingly, the wiring connected to the memory electrodes can be decreased. Accordingly, at the time of designing a mask pattern for forming the wiring, the designer can have a great reserve of designing. Since a gap formed between the memory electrodes is reduced to a half, at the time of designing a mask pattern for forming the memory electrodes, the designer can have a great reserve of designing.

The solid state imaging element explained in the above embodiment can be applied to an image pickup device such as a digital camera or a digital video camera. In the case where the solid state imaging element explained above is mounted on the image pickup device, when the imaging element driving portion provided in the image pickup device controls line memory pulses according to the photographing mode, it is possible to execute various types of driving such as a thinned-out reading drive or multiple field reading drive. Therefore, it is possible to execute photographing according to various photographing scenes without making the driving of the vertical electric charge transfer passage 1 complicated. In the following embodiments, a driving method of driving the solid state imaging element described above will be explained in detail.

Third Embodiment

In the present embodiment, explanations will be made into a method in which the horizontal electric charge transfer passage 2 of the solid state imaging element shown in FIG. 1 is subjected to the 6-phase driving by the transferring pulses φH1 to φH6.

Figure 12:
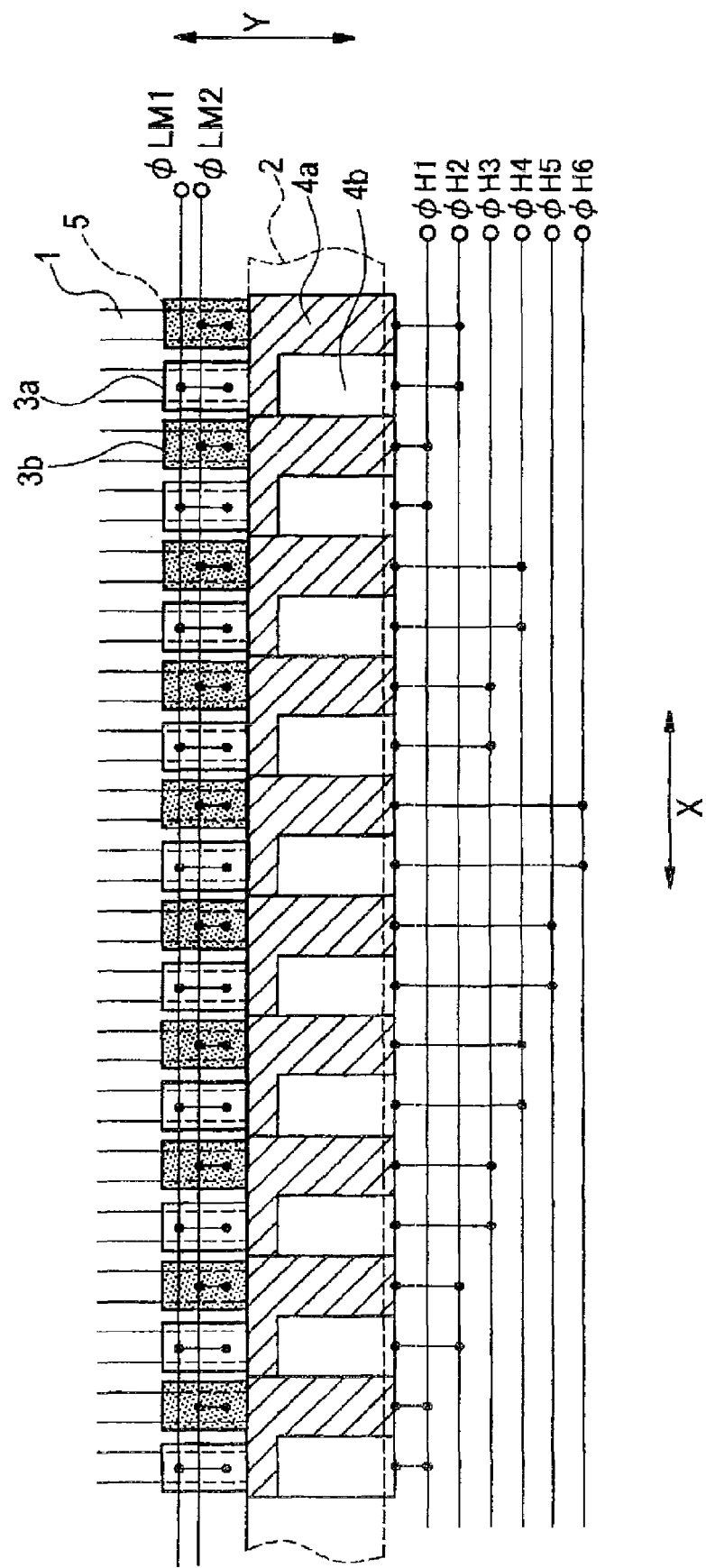
FIG. 12 is a view showing an example of wiring necessary for the 6-phase driving of the horizontal electric charge transfer passage of the solid state imaging element composed as shown in FIG. 1.

FIG. 12 is a view showing an example of wiring necessary for the 6-phase driving of the horizontal electric charge transfer passage 2 of the solid state imaging element composed as shown in FIG. 1. Like reference marks are used to indicate like components in FIGS. 1 and 12.

A plurality of electrode sets are provided above the horizontal electric charge passage 2 of the solid state imaging element shown in FIG. 1. However, in the solid state imaging element shown in FIG. 12, these electrode sets include: an electrode set H1 upon which the transferring pulse φH1 is applied by the imaging element driving portion mounted on an image pickup device not shown; an electrode set H2 upon which the transferring pulse φH2 is applied by the imaging element driving portion; an electrode set H3 upon which the transferring pulse φH3 is applied by the imaging element driving portion; an electrode set H4 upon which the transferring pulse φH4 is applied by the imaging element driving portion; an electrode set H5 upon which the transferring pulse φH5 is applied by the imaging element driving portion; and an electrode set H6 upon which the transferring pulse φH6 is applied by the imaging element driving portion. The transferring pulses φH1 to φH6 can be respectively put into the states of a high and the low level.

These electrode sets are arranged in such a manner that groups of the electrode sets, in which the electrode sets H1, H2, H3, H4, H5, H6, H3, H4 are arranged in this order, are repeatedly arranged in the horizontal direction.

Next, a driving method of driving the solid state imaging element shown in FIG. 12 will be explained below. The following explanations are made under the condition that an arrangement of the photoelectric conversion elements of the solid state imaging element is the same as that shown in FIG. 6B.

<First Driving Method>

Figure 13:
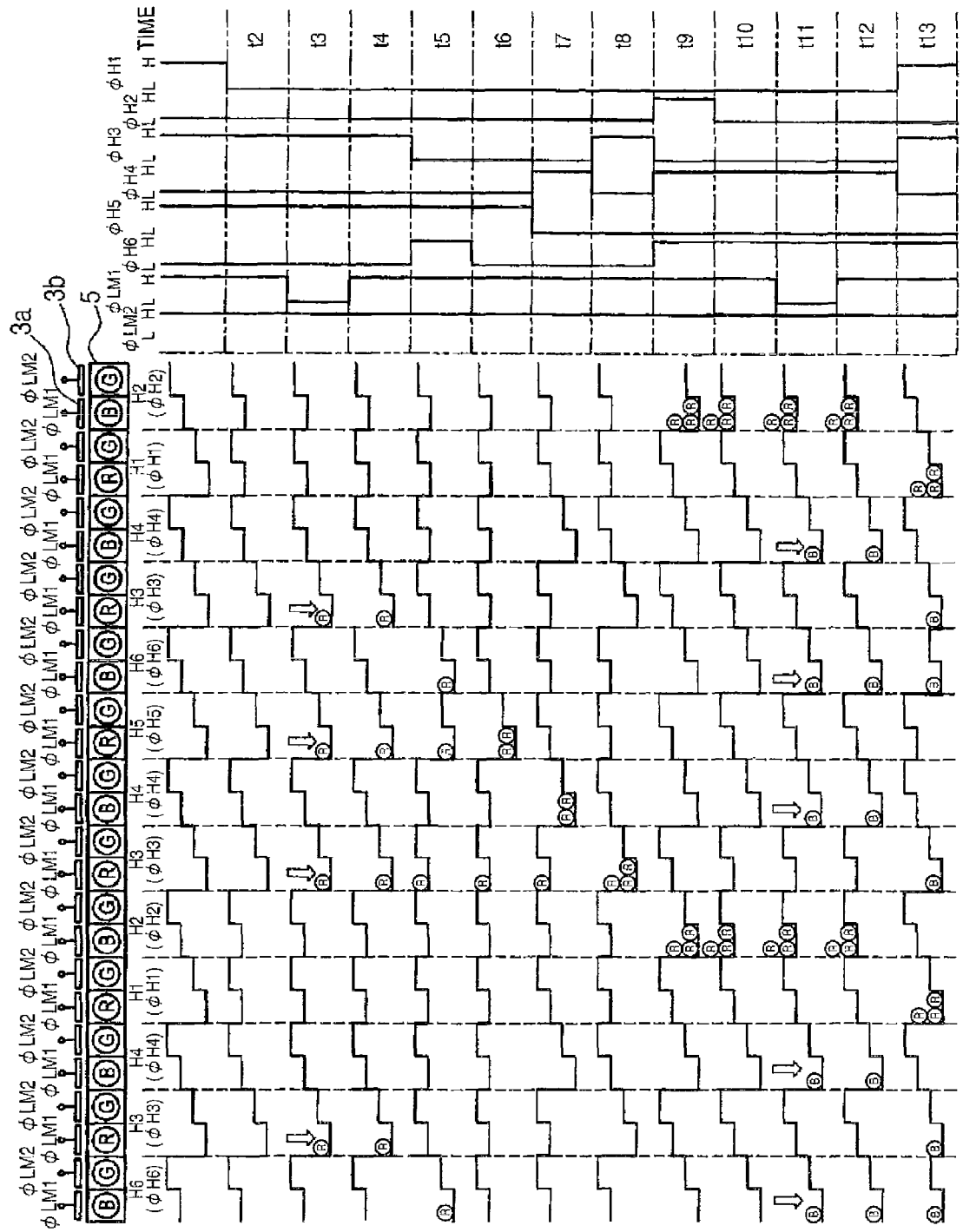
FIG. 13 is a view for explaining the first driving method of driving the solid state imaging element shown in FIG. 12.
Figure 14:
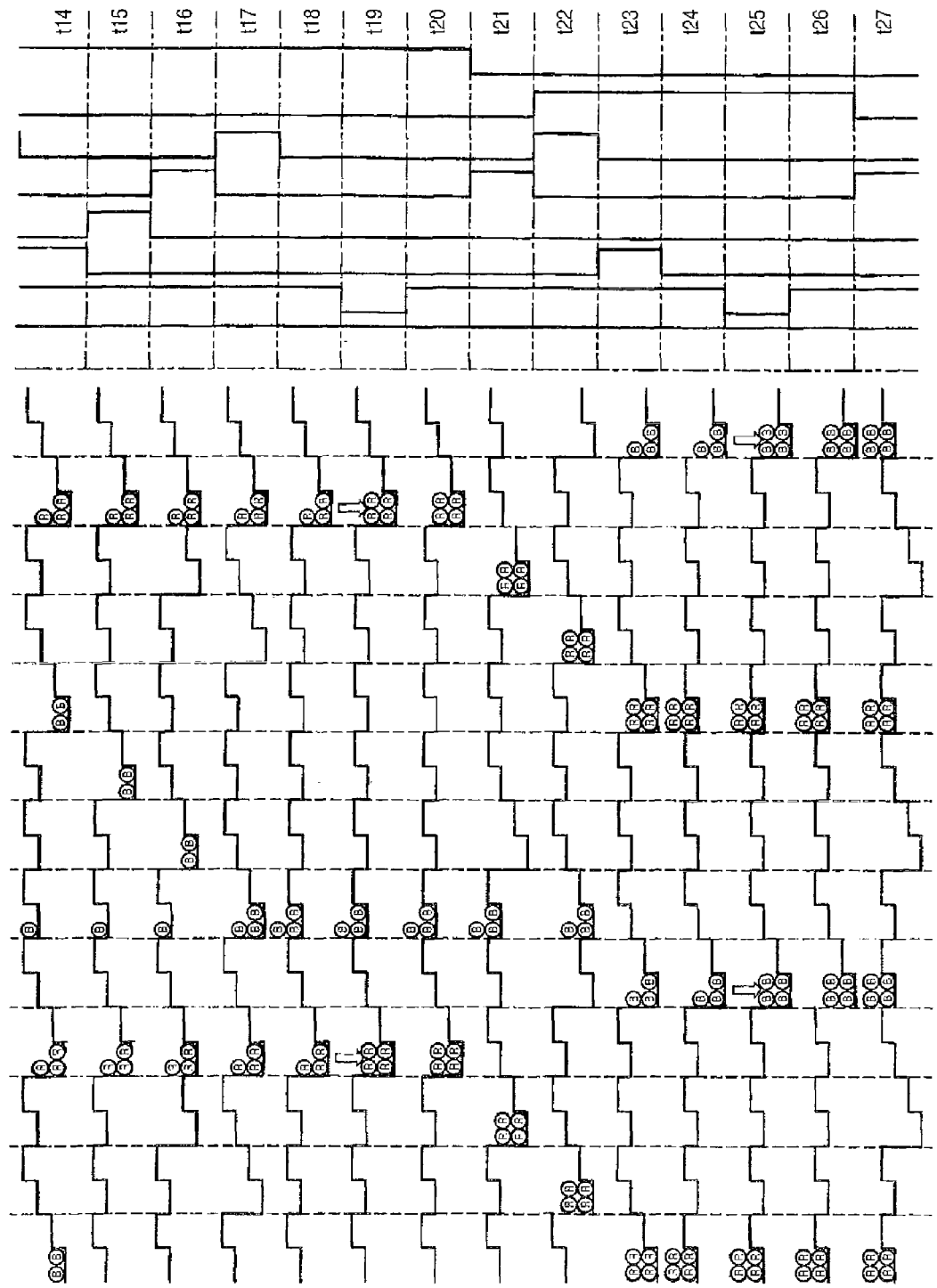
FIG. 14 is a view for explaining the first driving method of driving the solid state imaging element shown in FIG. 12.
Figure 15:
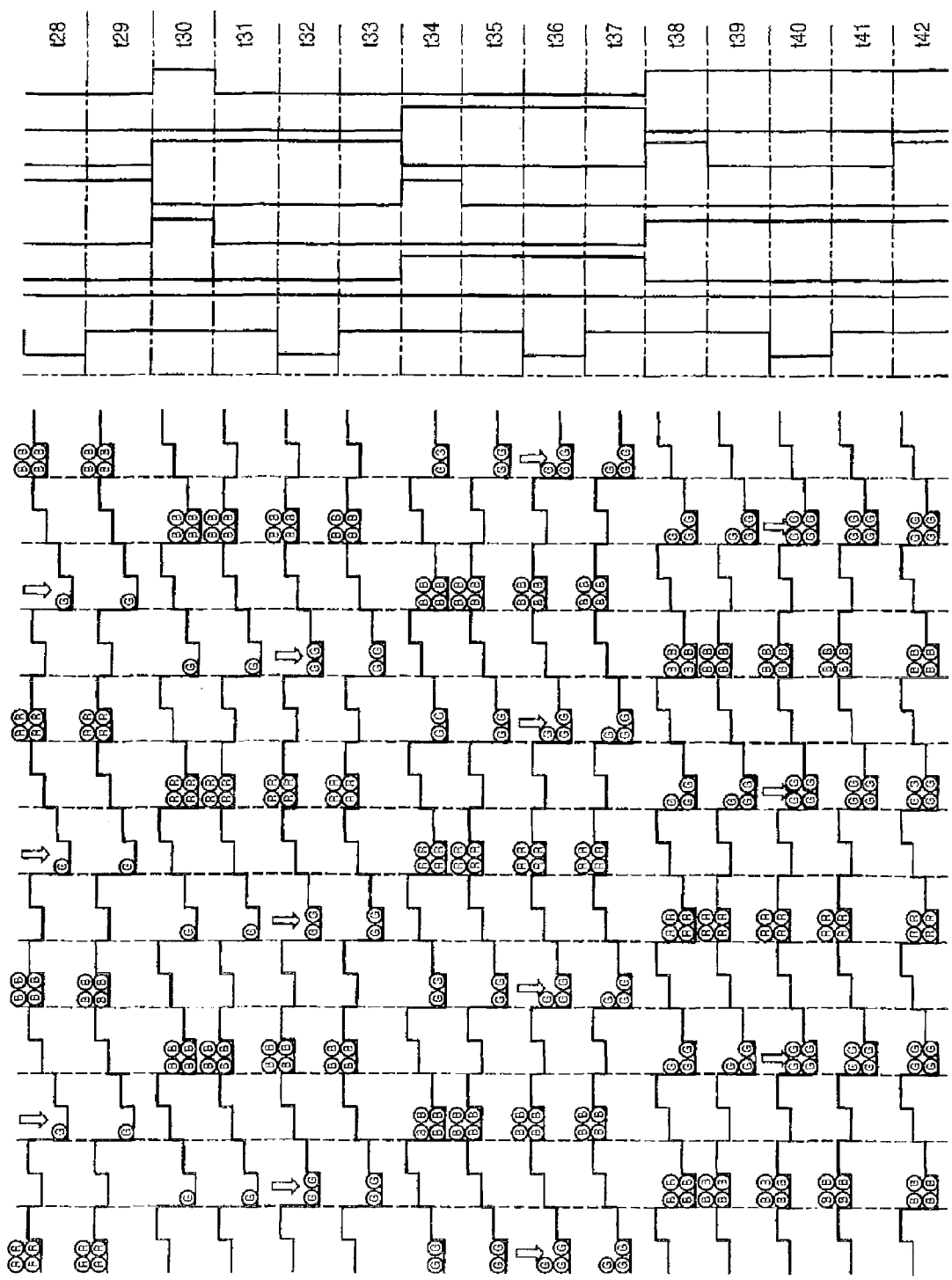
FIG. 15 is a view for explaining the first driving method of driving the solid state imaging element shown in FIG. 12.

FIGS. 13 to 15 are views for explaining the first driving method of driving the solid state imaging element shown in FIG. 12. In FIGS. 13 to 15, a timing chart of the line memory pulses φLM1, φLM2 and the transferring pulses φH1 to φH6 supplied to the solid state imaging element shown in FIG. 12 is shown and the potential of the horizontal electric charge transfer passage 2 below the electrode sets H1 to H6 at the time t1 to t42 is also shown.

At the time t3, φLM1 is made to be on the low level and the R electric charge, which is accumulated in the electric charge accumulating portion 5 connected to the electric charge transferring stage below the electrode sets H3 and H5 in the electric charge accumulating region 5 below the memory electrode 3a applied with φLM1, is transferred to the electrode transferring stage.

Next, at the time between t4 to t8, the transferring pulses φH1 to H6 are controlled as shown in the drawing. Three R electric charges, which are adjacent to each other, in the R electric charges transferred to the horizontal electric charge transfer passage 2 at the time t3 are mixed with each other in the horizontal electric charge transfer passage 2. The thus mixed electric charges are transferred to the horizontal electric charge transfer passage 2 below the electrode set H2 at the time t9.

Next, at the time t11, φLM1 is made to be on the low level and the B electric charge, which is accumulated in the electric charge accumulating region 5 connected to the electric charge transferring stage below the electrode sets H4 and H6 in the electric charge accumulating region 5 below the memory electrode 3a applied with φLM1, is transferred to the electric charge transferring stage concerned.

Next, at the time between t12 to t17, the transferring pulses φH1 to H6 are controlled as shown in the drawing. Three B electric charges, which are adjacent to each other, in the B electric charges transferred to the horizontal electric charge transfer passage 2 at the time t11 are mixed with each other in the horizontal electric charge transfer passage 2.

Next, at the time t19, φLM1 is made to be on the low level and the R electric charge, which is accumulated in the electric charge accumulating region 5 connected to the electric charge transferring stage below the electrode set H1 in the electric charge accumulating region 5 below the memory electrode 3a applied with φLM1, is transferred to the electric charge transferring stage concerned. In the electric charge transferring stage concerned, three R electric charges, which are mixed with each other, are existing. Therefore, at the point of time t19, the mixing of the four R electric charges is completed.

Next, at the time between t20 to t23, the transferring pulses φH1 to H6 are controlled as shown in the drawing and the four R electric charges, which are mixed with each other, are transferred to the horizontal electric charge transfer passage 2 below the electrode set H6 and the three B electric charges, which are mixed with each other, are transferred to the horizontal electric charge transfer passage 2 below the electrode set H2.

Next, at the time t25, φLM1 is made to be on the low level and the B electric charge, which is accumulated in the electric charge accumulating region 5 connected to the electric charge transferring stage below the electrode set H2 in the electric charge accumulating region 5 below the memory electrode 3a applied with LM1, is transferred to the electric charge transferring stage concerned. In the electric charge transferring stage concerned, three B electric charges, which are mixed with each other, are existing. Therefore, at the point of time t25, the mixing of the four B electric charges is completed.

Next, at the time t28, φLM2 is made to be on the low level and the G electric charge, which is accumulated in the electric charge accumulating region 5 connected to the electric charge transferring stage below the electrode set H4 in the electric charge accumulating region 5 below the memory electrode 3b applied with LM2, is transferred to the electric charge transferring stage concerned.

Next, at the time t30, the C electric charge in the horizontal electric charge transfer passage 2 below the electrode set H4 is transferred to the horizontal electric charge transfer passage 2 below the electrode set H3.

Next, at the time t32, φLM2 is made to be on the low level and the C electric charge, which is accumulated in the electric charge accumulating region 5 connected to the electric charge transferring stage below the electrode set H3 in the electric charge accumulating region 5 below the memory electrode 3b applied with φLM2, is transferred to the electric charge transferring stage concerned.

Next, at the time t34, the two G electric charges, which are mixed with each other, in the horizontal electric charge transfer passage 2 below the electrode set H3, are transferred to the horizontal electric charge transfer passage 2 below the electrode set H2 or H6.

Next, at the time t36, φLM2 is made to be on the low level and the G electric charge, which is accumulated in the electric charge accumulating region 5 connected to the electric charge transferring stage below the electrode sets H2 and H6 in the electric charge accumulating region 5 below the memory electrode 3b applied with φLM2, is transferred to the electric charge transferring stage concerned.

Next, at the time t38, the three G electric charges, which are mixed with each other, in the horizontal electric charge transfer passage 2 below the electrode set H2, are transferred to the horizontal electric charge transfer passage 2 below the adjoining electrode set H1. The three G electric charges, which are mixed with each other, in the horizontal electric charge transfer passage 2 below the electrode set H6 are transferred to the horizontal electric charge transfer passage 2 below the adjoining electrode set H5.

Next, at the time t40, φLM2 is made to be on the low level and the G electric charge, which is accumulated in the electric charge accumulating region 5 connected to the electric charge transferring stage below the electrode sets H1 and H5 in the electric charge accumulating region 5 below the memory electrode 3b applied with φLM2, is transferred to the electric charge transferring stage concerned. In the electric charge transferring stage, the three G electric charges, which are mixed with each other, are existing. Therefore, at the point of time t40, the mixing of the four G electric charges is completed.

After that, when the transferring pulses φH1 to φH6 are controlled, the mixed electric charges R, G and B are successively transferred in the horizontal direction X, so that the outputting of signals corresponding to the electric charges of one line can be completed. When the above processing is executed for all lines, it is possible to obtain signals from all the photoelectric conversion elements.

As described above, according to the solid state imaging element, the constitution of which is shown in FIG. 12, the transferring processing of the electric charges from the electric charge accumulating region 5 to the horizontal electric charge transfer passage 2 can be finely controlled by the combination of the line memory pulses φLM1, φLM2 with the transferring pulses φH1 to φH6. Therefore, the processing, in which four electric charges of the same color component in the electric charges accumulated in all the electric charge accumulating regions 5 are mixed with each other in the horizontal electric charge transfer passage 2, can be realized by changing pulses only 40 times. Therefore, as compared with a case in which four electric charges are mixed with each other in the conventional constitution, the processing time can be greatly reduced. As a result, when this four pixel mixing processing is employed for the movie photographing mode, it is possible to attain a high frame rate even if the number of pixels is increased.

Further, according to the first driving method, even after the electric charges have been mixed, an arrangement of the electric charges is not changed. Therefore, it is possible to generate image data without executing a special signal processing. From this point of view, it is possible to realize a high frame rate.

<Second Driving Method>

Next, explanations will be made into another example of the driving method of driving the solid state imaging element, the constitution of which is shown in FIG. 12.

Figure 16:
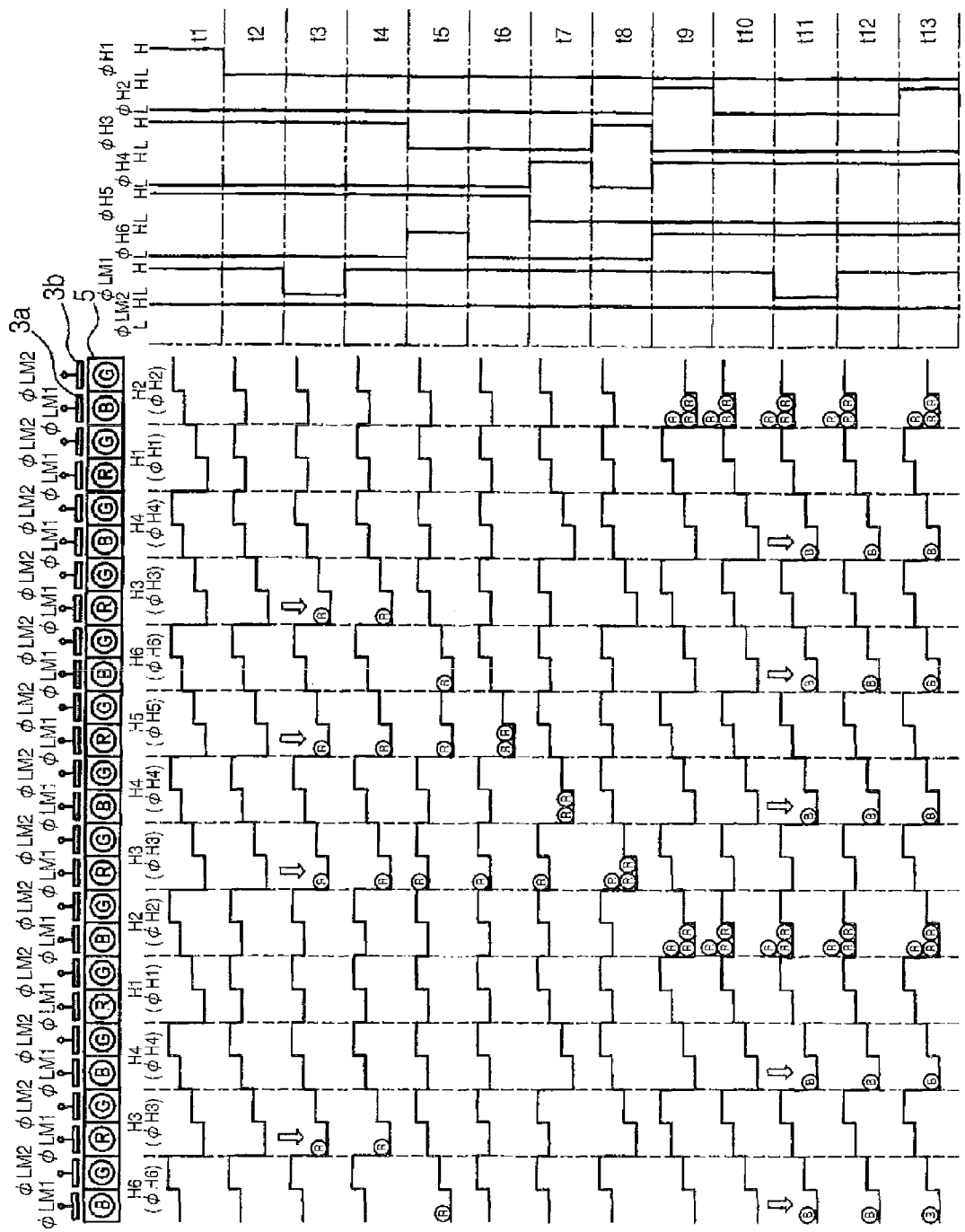
FIG. 16 is a view for explaining the second driving method of driving the solid state imaging element shown in FIG. 12.
Figure 17:
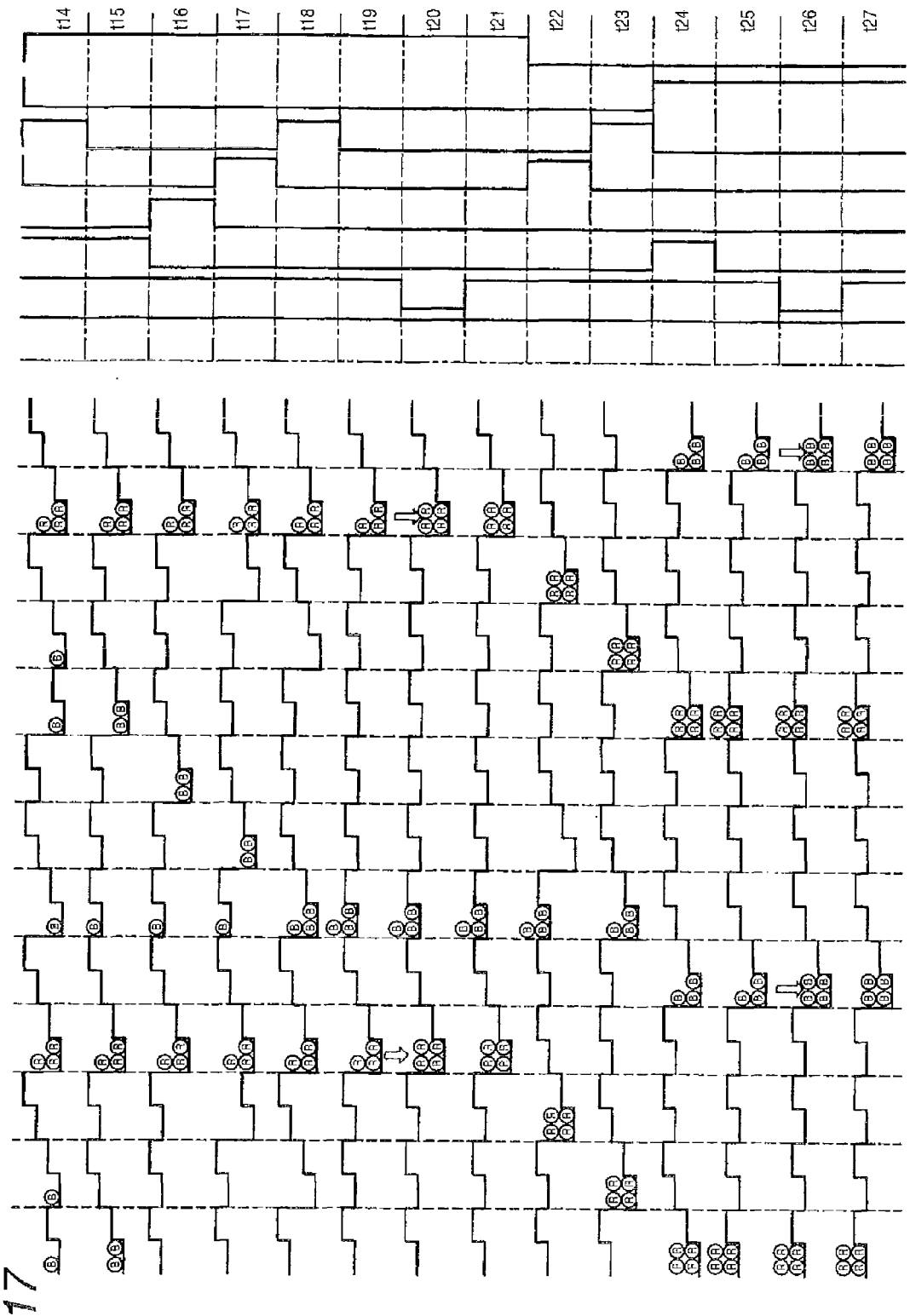
FIG. 17 is a view for explaining the second driving method of driving the solid state imaging element shown in FIG. 12.
Figure 18:
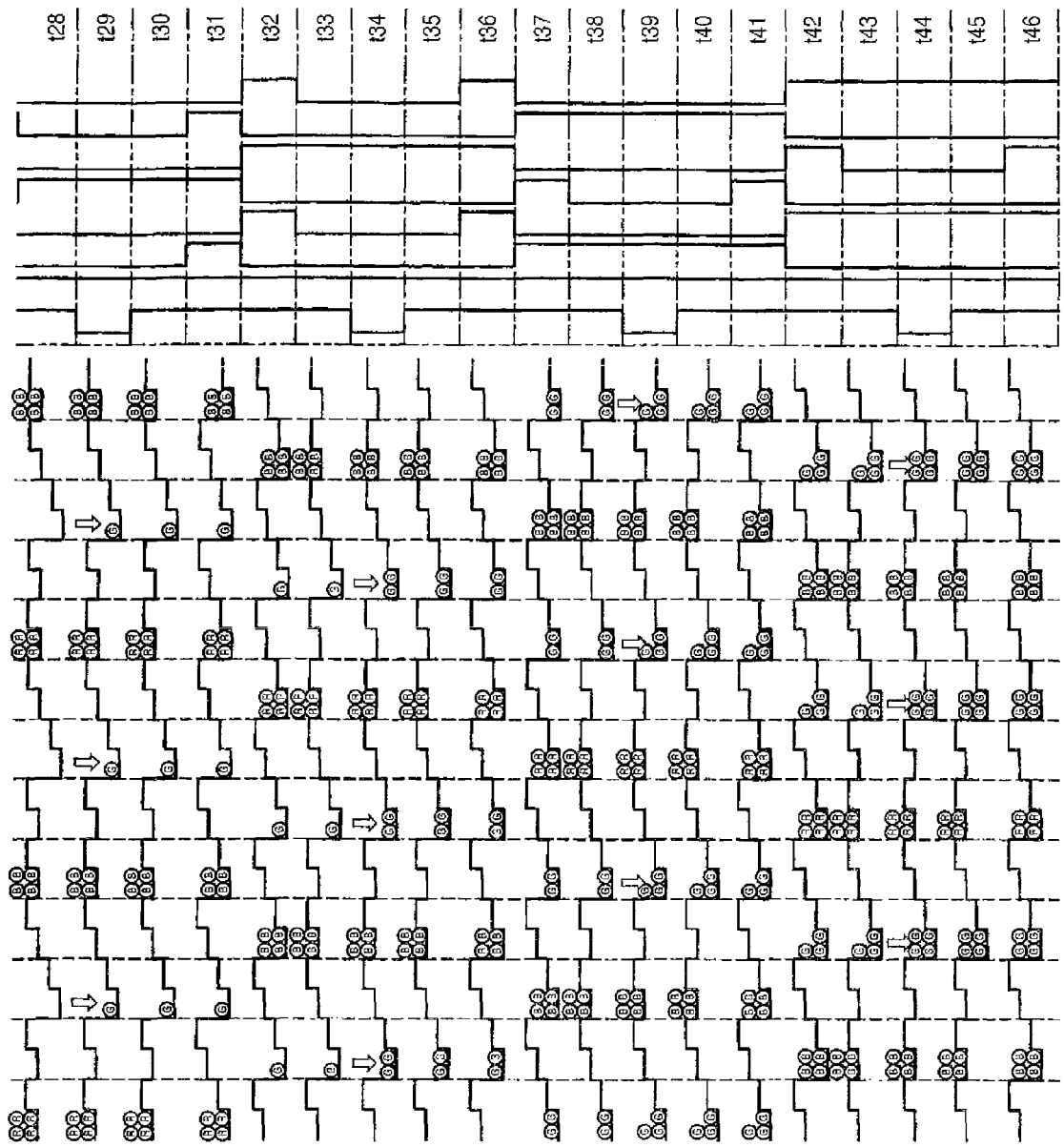
FIG. 18 is a view for explaining the second driving method of driving the solid state imaging element shown in FIG. 12.

FIGS. 16 to 18 are views for explaining the second driving method of driving the solid state imaging element shown in FIG. 12. In FIGS. 16 to 18, a timing chart of the line memory pulses φLM1, φLM2 and the transferring pulses φH1 to φH6 supplied to the solid state imaging element shown in FIG. 12 is shown and the potential of the horizontal electric charge transfer passage 2 below the electrode sets H1 to H6 at the time t1 to t46 is also shown.

At the time t3, φLM1 is made to be on the low level and the R electric charge, which is accumulated in the electric charge accumulating region 5 connected to the electric charge transferring stage below the electrode sets H3 and H5 in the electric charge accumulating region 5 below the memory electrode 3a applied with φLM1, is transferred to the electric charge transferring stage concerned.

Next, at the time between t4 to t8, the transferring pulses φH1 to H6 are controlled as shown in the drawing and three R electric charges, which are adjacent to each other, in the R electric charges transferred to the horizontal electric charge transfer passage 2 at the time t3 are mixed with each other in the horizontal electric charge transfer passage 2. The thus mixed electric charges are transferred to the horizontal electric charge transfer passage 2 below the electrode set H2 at the time t9.

Next, at the time t11, φLM1 is made to be on the low level and the B electric charge, which is accumulated in the electric charge accumulating region 5 connected to the electric charge transferring stage below the electrode sets H4 and H6 in the electric charge accumulating region 5 below the memory electrode 3a applied with φLM1, is transferred to the electric charge transferring stage concerned.

Next, at the time between t12 to t18, the transferring pulses φH1 to H6 are controlled as shown in the drawing and three electric charges, which are adjacent to each other, in the B electric charges transferred to the horizontal electric charge transfer passage 2 at the time t11 are mixed with each other in the horizontal electric charge transfer passage 2.

In this connection, in the first driving method shown in FIGS. 13 to 15, when the three R electric charges located below the electrode set H2 are transferred to below the adjoining electrode set H1 from the time t12 to the time t13, although the potential of the horizontal electric charge transfer passage 2 below the electrode set H2 is changed from the low level to the high level, the transmission is executed. In this case, there is a possibility that the R electric charge flows into another electric charge transmission stage. Therefore, in the second driving method, after the potential of the packet, in which the R electric charges are accumulated, has been made to be on the high level at the time t13, the R electric charges in the packet concerned are transferred to below the adjoining electrode set H1. Due to the foregoing, it is possible to prevent the leakage of the transmission described above.

Next, at the time t20, φLM1 is made to be on the low level and the R electric charge, which is accumulated in the electric charge accumulating region 5 connected to the electric charge transferring stage below the electrode set H1 in the electric charge accumulating region 5 below the memory electrode 3a applied with φLM1, is transferred to the electric charge transferring stage concerned. In the electric charge transferring stage, the three R electric charges, which are mixed with each other, are existing. Therefore, at the point of time t20, the mixing of the four R electric charges is completed.

Next, between the time t21 and t24, the transmission pulses φH1 to φH6 are controlled as shown in the drawing and the four R electric charges, which are mixed with each other, are transferred to the horizontal electric charge transfer passage 2 below the electrode set H6 and the three B electric charges, which are mixed with each other, are transferred to the horizontal electric charge transfer passage 2 below the electrode set H2.

At the time t26, φLM1 is made to be on the low level and the B electric charge, which is accumulated in the electric charge accumulating region 5 connected to the electric charge transferring stage below the electrode set H2 in the electric charge accumulating region 5 below the memory electrode 3$a$ applied with φLM1, is transferred to the electric charge transferring stage concerned. In the electric charge transferring stage concerned, the three B electric charges, which are mixed with each other, are existing. Therefore, at the point of time t26, the mixing of the four B electric charges is completed.

At the time t29, φLM2 is made to be on the low level and the G electric charge, which is accumulated in the electric charge accumulating region 5 connected to the electric charge transferring stage below the electrode set H4 in the electric charge accumulating region 5 below the memory electrode 3$b$ applied with φLM2, is transferred to the electric charge transferring stage concerned.

Next, in order to prevent the leakage of the electric charges described above, the potential of the horizontal electric charge transfer passage 2 below the electrode sets H6 and H2 is made to be on the high level at the time t31. Next, at the time t32, the G electric charge located in the horizontal electric charge transfer passage 2 below the electrode set H4 is transferred to the horizontal electric charge transfer passage 2 below the electrode set H3.

Next, at the time t34, φLM2 is made to be on the low level and the G electric charge, which is accumulated in the electric charge accumulating region 5 connected to the electric charge transferring stage below the electrode set H3 in the electric charge accumulating region 5 below the memory electrode 3$b$ applied with φLM2, is transferred to the electric charge transferring stage concerned.

Next, in order to prevent the leakage of the electric charges described before, at the time t36, the potential of the horizontal electric charge transfer passage 2 below the electrode sets H5 and H11 is made to be on the high level. Next, at the time t37, the two G electric charges, which are mixed with each other, located in the horizontal electric charge passage 2 below the electrode set H3 are transferred to the horizontal electric charge transfer passage 2 below the electrode set H2 or H6.

Next, at the time t39, φLM2 is made to be on the low level and the G electric charge, which is accumulated in the electric charge accumulating region 5 connected to the electric charge transferring stage below the electrode sets H2 and H6 in the electric charge accumulating region 5 below the memory electrode 3$b$ applied with φLM2, is transferred to the electric charge transferring stage concerned.

Next, in order to prevent the leakage of the electric charges described before, at the time t41, the potential of the horizontal electric charge transfer passage 2 below the electrode set H4 is made to be on the high level. Next, at the time t42, the three G electric charges, which are mixed with each other, located in the horizontal electric charge passage 2 below the electrode set H2 are transferred to the horizontal electric charge transfer passage 2 below the adjoining electrode set H1 and the three G electric charges, which are mixed with each other, located in the horizontal electric charge passage 2 below the electrode set H6 are transferred to the horizontal electric charge transfer passage 2 below the adjoining electrode set H5.

Next, at the time t44, φLM2 is made to be on the low level and the G electric charge, which is accumulated in the electric charge accumulating region 5 connected to the electric charge transferring stage below the electrode sets H1 and H5 in the electric charge accumulating region 5 below the memory electrode 3$b$ applied with φLM2, is transferred to the electric charge transferring stage concerned. In the electric charge transferring stage concerned, the three C electric charges, which are mixed with each other, are existing. Therefore, at the point of time t44, the mixing of the four C electric charges is completed.

After that, when the transferring pulses φH1 to φH6 are controlled, the mixed electric charges R, G and B are successively transferred in the horizontal direction X, so that the outputting of signals corresponding to the electric charges of one line can be completed. When the above processing is executed for all lines, it is possible to obtain signals from all the photoelectric conversion elements.

As described above, according to the second driving method, it is possible to prevent a leakage of the electric charges which could be caused in the first driving method and further it is possible to execute photographing movies of a high frame rate and quality.

Fourth Embodiment

In the present embodiment, explanations will be made into a method in which the horizontal electric charge transfer passage 2 of the solid state imaging element shown in FIG. 10 is subjected to the 6-phase driving by the transferring pulses φH1 to φH6.

Figure 19:
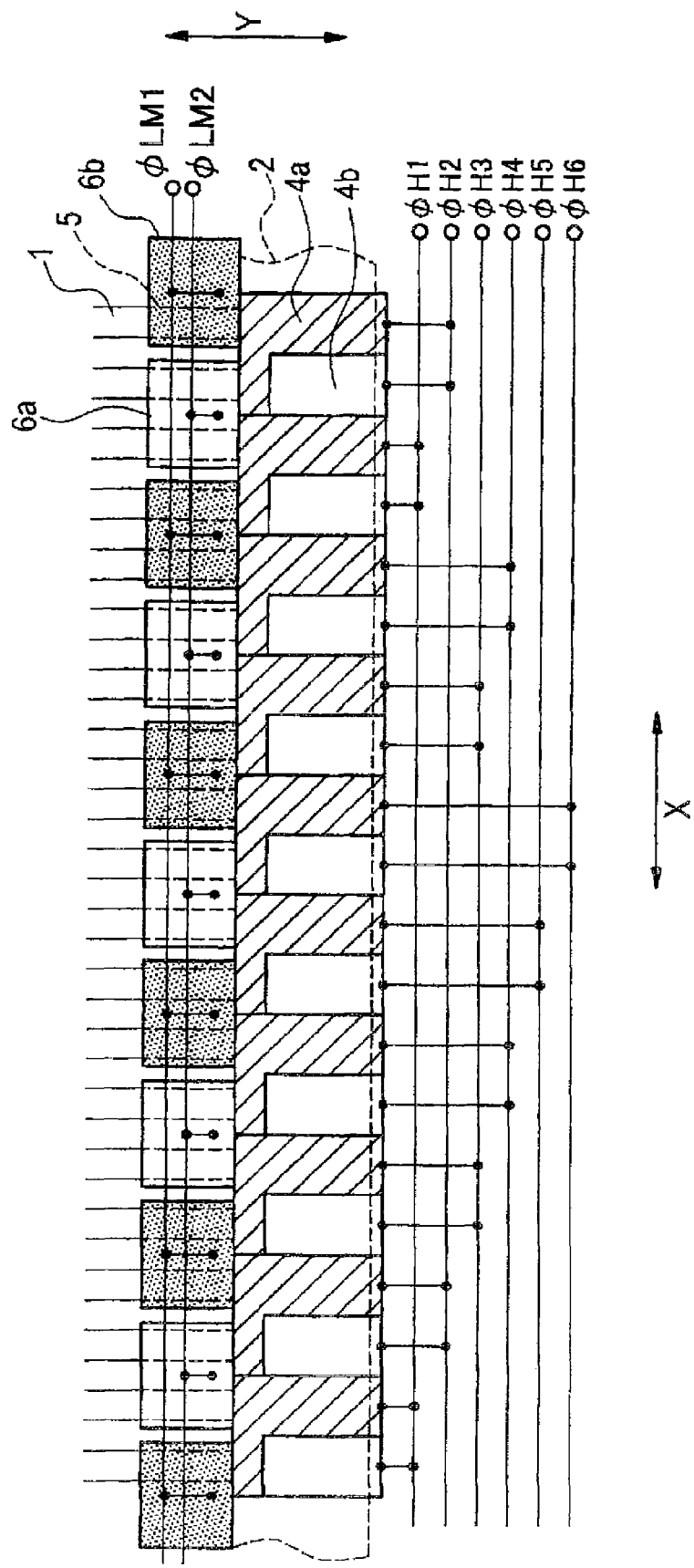
FIG. 19 is a view showing an example of wiring necessary for the 6-phase driving of the horizontal electric charge transfer passage of the solid state imaging element composed as shown in FIG. 10.

FIG. 19 is a view showing an example of wiring necessary for the 6-phase driving of the horizontal electric charge transfer passage 2 of the solid state imaging element composed as shown in FIG. 10. Like reference marks are used to indicate like components in FIGS. 10 and 19.

A plurality of electrode sets are provided above the horizontal electric charge transfer passage 2 of the solid state imaging element shown in FIG. 10. However, in the solid state imaging element shown in FIG. 19, these electrode sets include: an electrode set H1 upon which the transferring pulse φH1 is applied by the imaging element driving portion mounted on an image pickup device not shown; an electrode set H2 upon which the transferring pulse φH2 is applied by the imaging element driving portion; an electrode set H3 upon which the transferring pulse φH3 is applied by the imaging element driving portion; an electrode set H4 upon which the transferring pulse φH4 is applied by the imaging element driving portion; an electrode set H5 upon which the transferring pulse φH5 is applied by the imaging element driving portion; and an electrode set H6 upon which the transferring pulse φH6 is applied by the imaging element driving portion. The transferring pulses φH1 to φH6 can be respectively put into the states of a high and the low level.

These electrode sets are arranged in such a manner that groups of the electrode sets, in which the electrode sets H1, H2, H3, H4, H5, H6, H3, H4 are arranged in this order, are repeatedly arranged in the horizontal direction.

Next, a driving method of driving the solid state imaging element shown in FIG. 19 will be explained below. The following explanations are made under the condition that an arrangement of the photoelectric conversion elements of the solid state imaging element is the same as that shown in FIG. 6B.

<First Driving Method>

Figure 20:
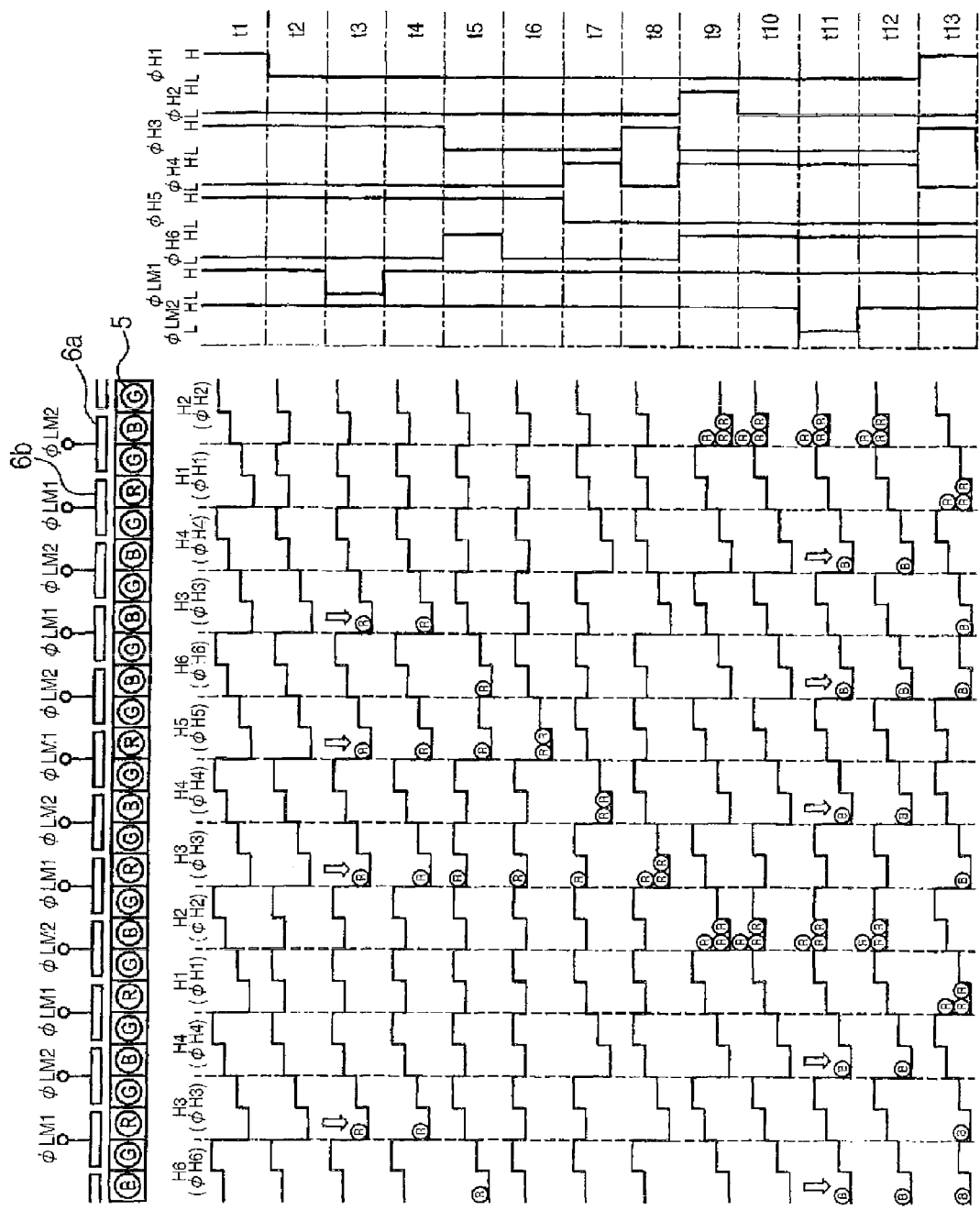
FIG. 20 is a view for explaining the first driving method of driving the solid state imaging element shown in FIG. 19.
Figure 21:
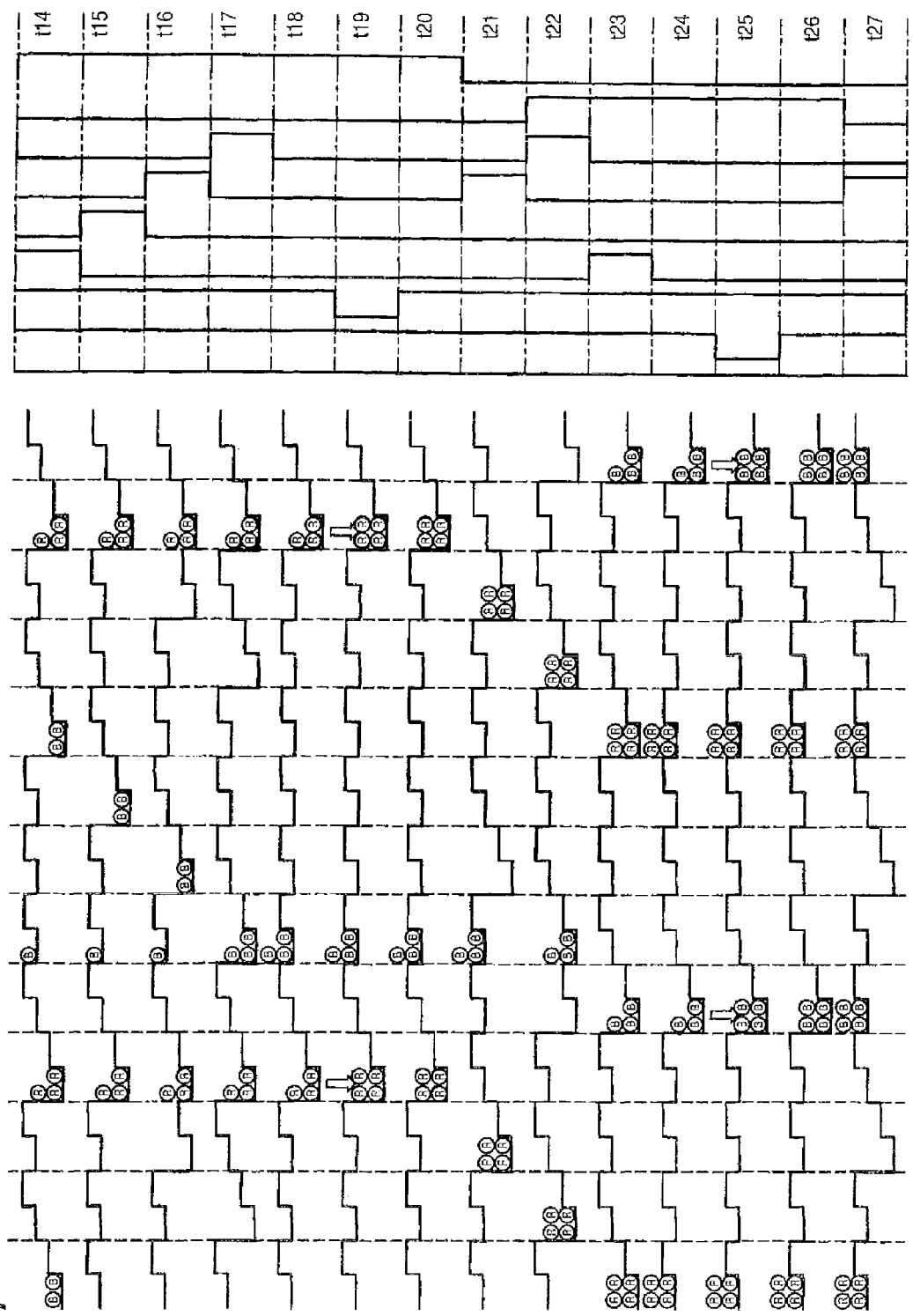
FIG. 21 is a view for explaining the first driving method of driving the solid state imaging element shown in FIG. 19.
Figure 22:
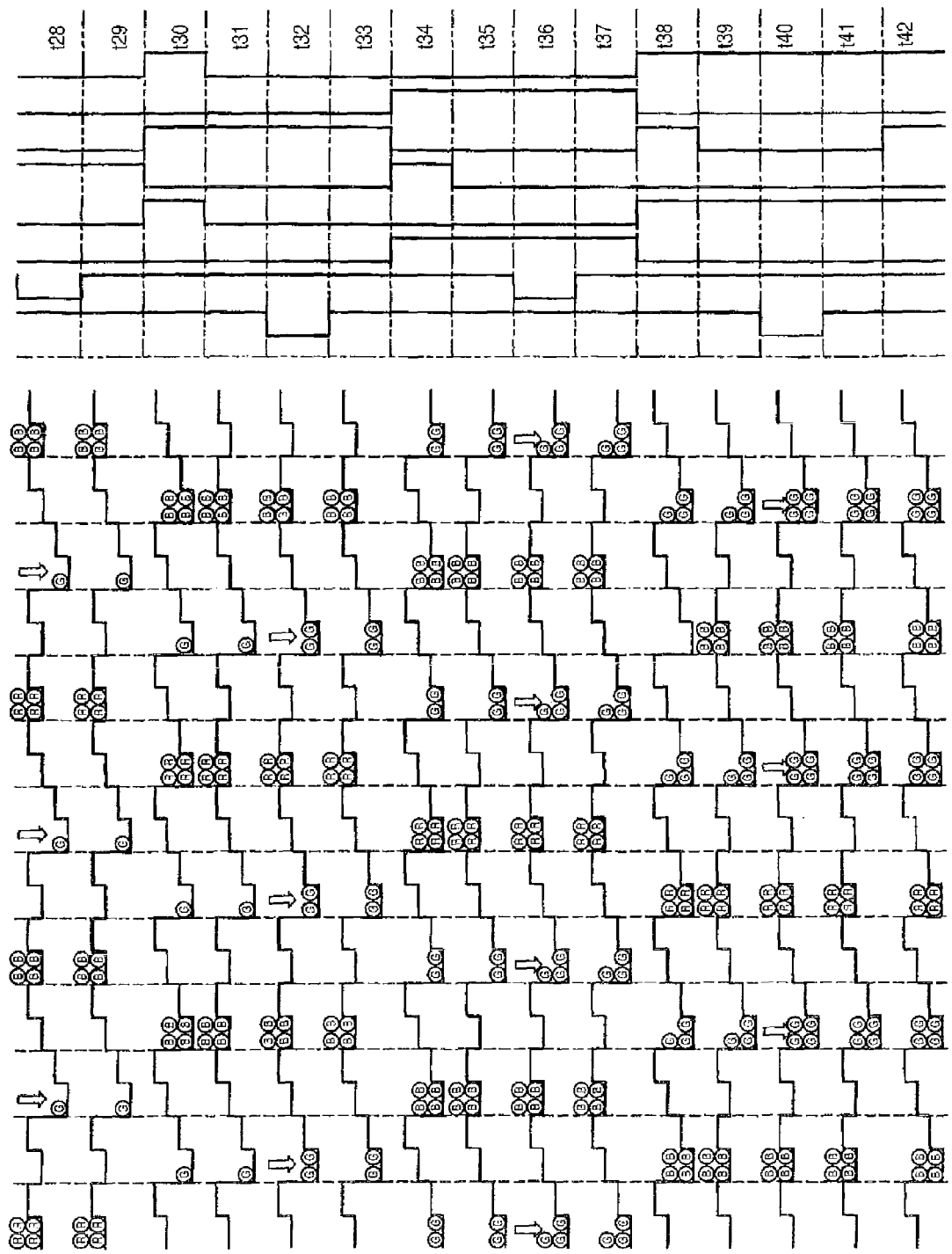
FIG. 22 is a view for explaining the first driving method of driving the solid state imaging element shown in FIG. 19.

FIGS. 20 to 22 are views for explaining the first driving method of driving the solid state imaging element shown in FIG. 19. In FIGS. 20 to 22, a timing chart of the line memory pulses φLM1, φLM2 and the transferring pulses φH1 to φH6 supplied to the solid state imaging element shown in FIG. 19 is shown and the potential of the horizontal electric charge transfer passage 2 below the electrode sets H1 to H6 at the time t1 to t42 is also shown.

At the time t3, φLM1 is made to be on the low level and the R electric charge, which is accumulated in the electric charge accumulating portion 5 connected to the electric charge transferring stage below the electrode sets H3 and H5 in the electric charge accumulating region 5 below the memory electrode 6b applied with φLM1, is transferred to the electrode transferring stage.

Next, at the time between t4 to t8, the transferring pulses φH1 to φH6 are controlled as shown in the drawing. Three R electric charges, which are adjacent to each other, in the R electric charges transferred to the horizontal electric charge transfer passage 2 at the time t3 are mixed with each other in the horizontal electric charge transfer passage 2. The thus mixed electric charges are transferred to the horizontal electric charge transfer passage 2 below the electrode set H2 at the time t9.

Next, at the time t11, φLM2 is made to be on the low level and the B electric charge, which is accumulated in the electric charge accumulating region 5 connected to the electric charge transferring stage below the electrode sets H4 and H6 in the electric charge accumulating region 5 below the memory electrode 6a applied with φLM2, is transferred to the electric charge transferring stage concerned.

Next, between the time t12 and t17, the transmission pulses φH1 to φH6 are controlled as shown in the drawing. Then, the three B electric charges, which are adjacent to each other, in the B electric charges transferred to the horizontal electric charge transfer passage 2 at the time t11 are mixed with each other in the horizontal electric charge transfer passage 2.

At the time t19, φLM1 is made to be on the low level and the R electric charge, which is accumulated in the electric charge accumulating region 5 connected to the electric charge transferring stage below the electrode set H1 in the electric charge accumulating region 5 below the memory electrode 6b applied with φLM1, is transferred to the electric charge transferring stage concerned. In the electric charge transferring stage concerned, the three R electric charges, which are mixed with each other, are existing. Therefore, at the point of time t19, the mixing of the four R electric charges is completed.

Next, between the time t20 and t24, the transmission pulses φH1 to φH6 are controlled as shown in the drawing and the four R electric charges, which are mixed with each other, are transferred to the horizontal electric charge transfer passage 2 below the electrode set H6 and the three B electric charges, which are mixed with each other, are transferred to the horizontal electric charge transfer passage 2 below the electrode set H2.

At the time t25, φLM2 is made to be on the low level and the B electric charge, which is accumulated in the electric charge accumulating region 5 connected to the electric charge transferring stage below the electrode set H2 in the electric charge accumulating region 5 below the memory electrode 6a applied with φLM2, is transferred to the electric charge transferring stage concerned. In the electric charge transferring stage concerned, the three B electric charges, which are mixed with each other, are existing. Therefore, at the point of time t25, the mixing of the four B electric charges is completed.

Next, at the time t28, φLM1 is made to be on the low level and the G electric charge, which is accumulated in the electric charge accumulating region 5 connected to the electric charge transferring stage below the electrode set H4 in the electric charge accumulating region 5 below the memory electrode 6b applied with φLM1, is transferred to the electric charge transferring stage concerned.

Next, at the time t30, the G electric charge located in the horizontal electric charge transfer passage 2 below the electrode set H4 is transferred to the horizontal electric charge transfer passage 2.

Next, at the time t32, φLM2 is made to be on the low level and the G electric charge, which is accumulated in the electric charge accumulating region 5 connected to the electric charge transferring stage below the electrode set H3 in the electric charge accumulating region 5 below the memory electrode 6a applied with φLM2, is transferred to the electric charge transferring stage concerned.

Next, at the time t34, the two G electric charges, which are mixed with each other, located in the horizontal electric charge transfer passage 2 below the electrode set H3 are transferred to the horizontal electric charge transfer passage 2 below the electrode set H2 or H6.

Next, at the time t36, φLM1 is made to be on the low level and the G electric charge, which is accumulated in the electric charge accumulating region 5 connected to the electric charge transferring stage below the electrode sets H2 and H6 in the electric charge accumulating region 5 below the memory electrode 6b applied with φLM1, is transferred to the electric charge transferring stage concerned.

Next, at the time t38, the three G electric charges, which are mixed with each other, located in the horizontal electric charge passage 2 below the electrode set H2 are transferred to the horizontal electric charge transfer passage 2 below the adjoining electrode set H1 and the three G electric charges, which are mixed with each other, located in the horizontal electric charge transfer passage 2 below the electrode set H6 are transferred to the horizontal electric charge transfer passage 2 below the adjoining electrode set H5.

At the time t40, φLM2 is made to be on the low level and the G electric charge, which is accumulated in the electric charge accumulating region 5 connected to the electric charge transferring stage below the electrode sets H1 and H5 in the electric charge accumulating region 5 below the memory electrode 6a applied with φLM2, is transferred to the electric charge transferring stage concerned. In the electric charge transferring stage concerned, the three G electric charges, which are mixed with each other, are existing. Therefore, at the point of time t40, the mixing of the four G electric charges is completed.

After that, when the transferring pulses φH1 to φH6 are controlled, the mixed R electric charge, the mixed G electric charge and the mixed B electric charge are successively transferred in the horizontal direction X and the signals corresponding to the electric charges of one line are outputted. When the above processing is executed for all lines, signals can be obtained from all the photoelectric conversion elements.

As described above, according to the solid state imaging element, the constitution of which is shown in FIG. 19, the transferring processing of the electric charges from the electric charge accumulating region 5 to the horizontal electric charge transfer passage 2 can be finely controlled by the combination of the line memory pulses φLM1, φLM2 with the transferring pulses φH1 to φH6. Therefore, the processing, in which four electric charges of the same color component in the electric charges accumulated in all the electric charge accumulating regions 5 are mixed with each other in the horizontal electric charge transfer passage 2, can be realized by changing pulses only 40 times. Therefore, as compared with a case in which four electric charges are mixed with each other in the conventional constitution, the processing time can be greatly reduced. As a result, when this four pixel mixing processing is employed for the movie photographing modes it is possible to attain a high frame rate even if the number of pixels is increased.

Further, according to the present driving method, even after the electric charges have been mixed, an arrangement of the electric charges is not changed. Therefore, it is possible to generate image data without executing a special signal processing. From this point of view, it is possible to realize a high frame rate.

<Second Driving Method>

Figure 23:
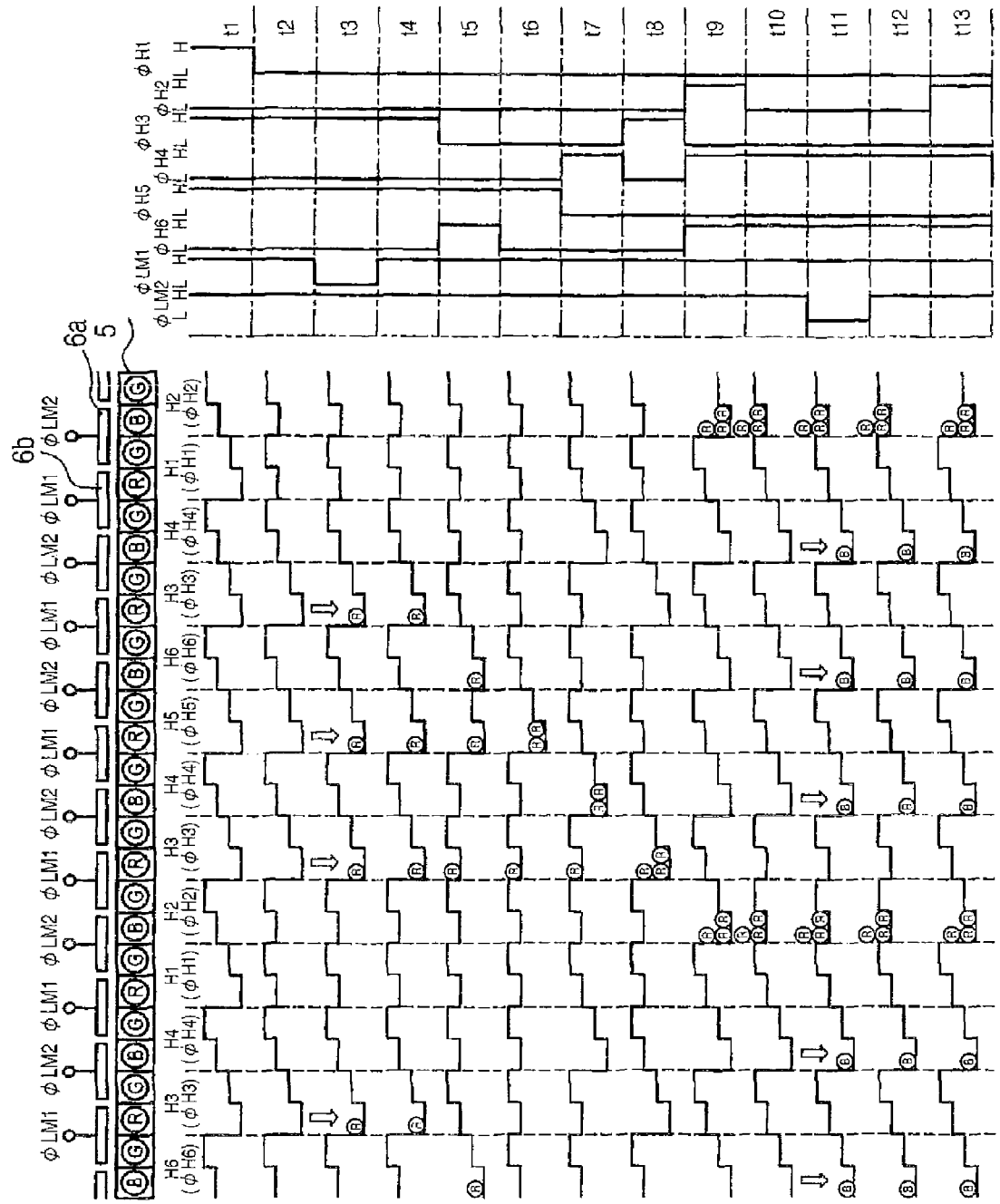
FIG. 23 is a view for explaining the second driving method of driving the solid state imaging element shown in FIG. 19.
Figure 24:
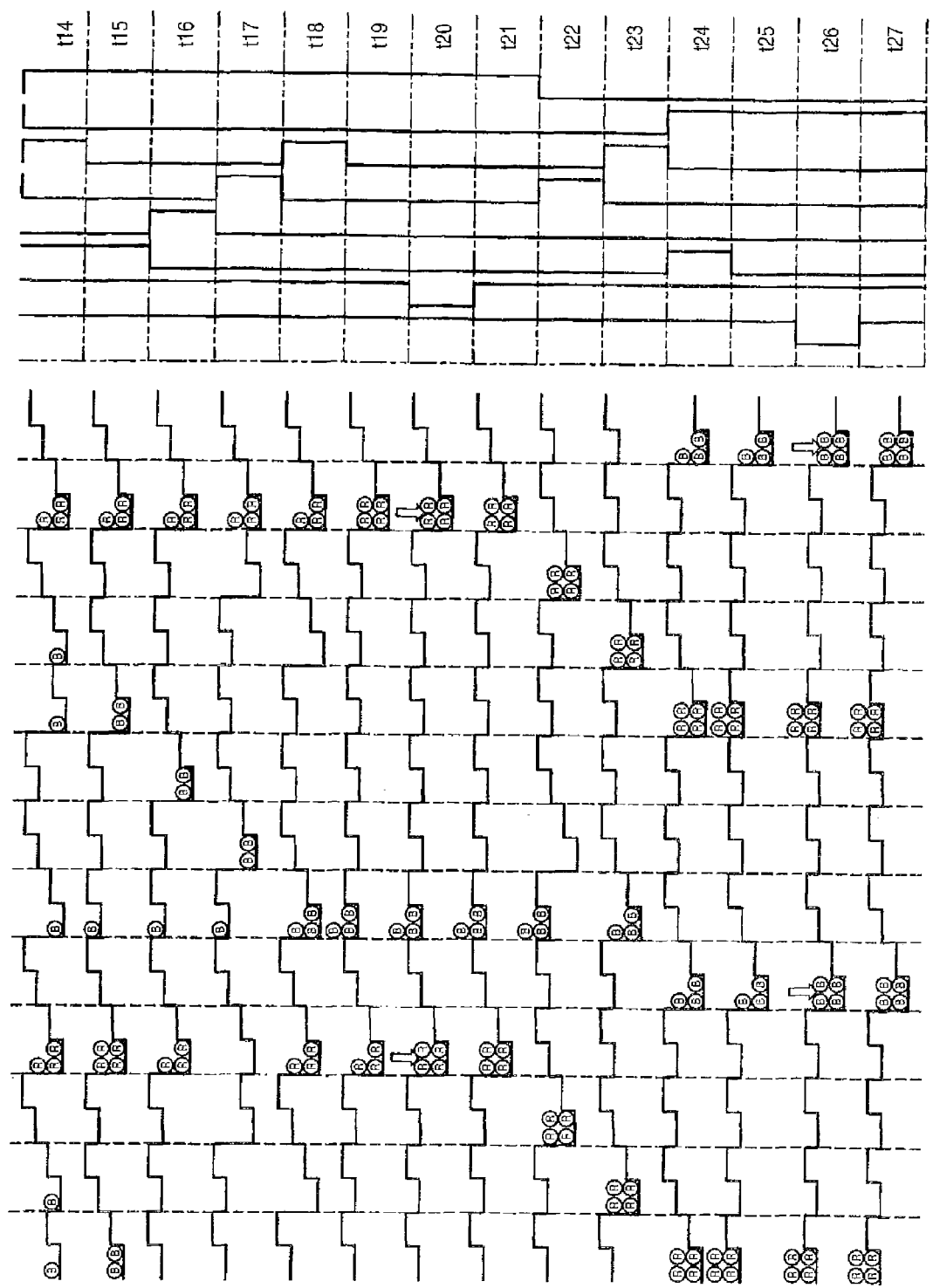
FIG. 24 is a view for explaining the second driving method of driving the solid state imaging element shown in FIG. 19.
Figure 25:
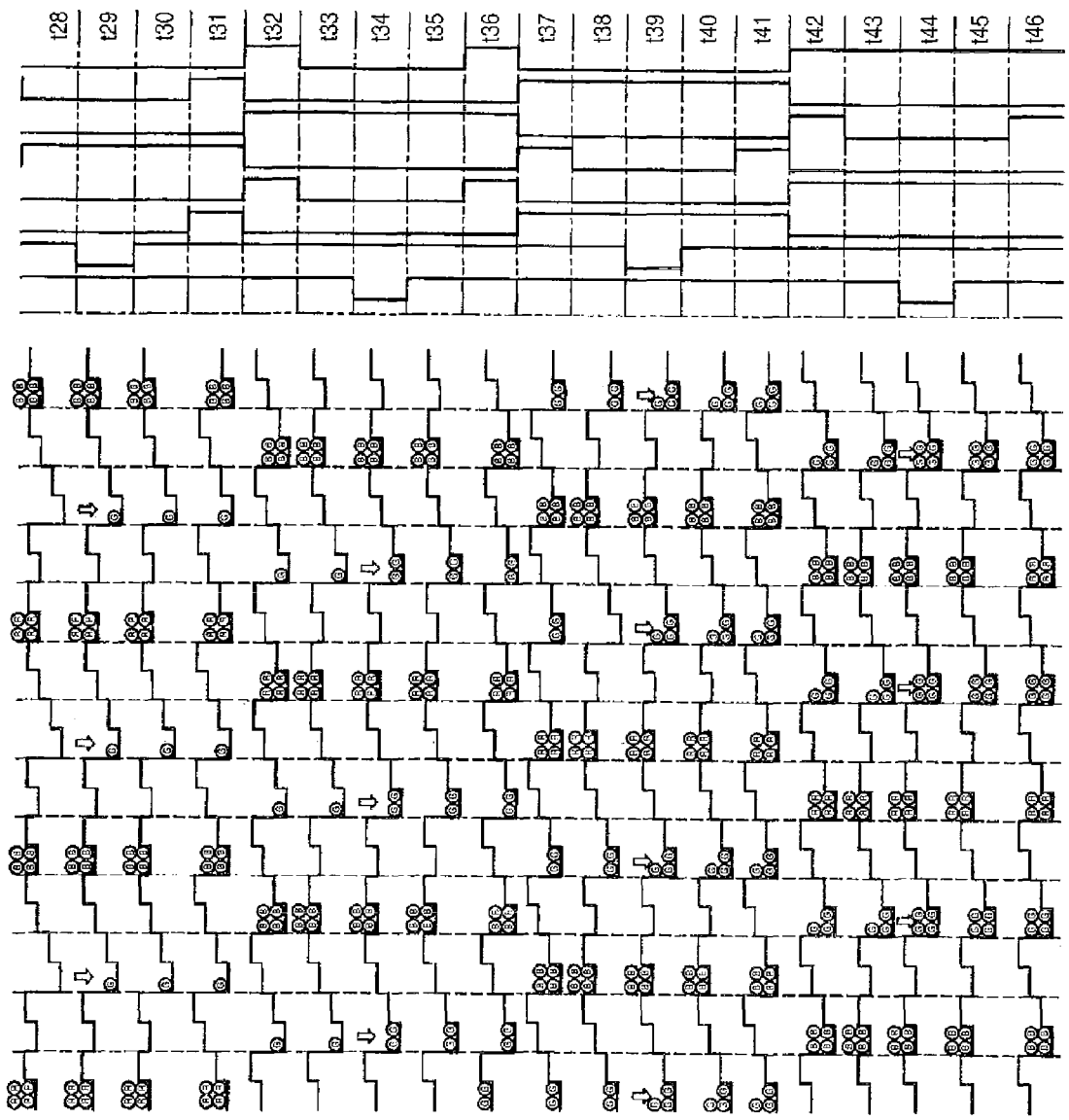
FIG. 25 is a view for explaining the second driving method of driving the solid state imaging element shown in FIG. 19.

FIGS. 23 to 25 are views for explaining the second driving method of driving the solid state imaging element shown in FIG. 19. In FIGS. 23 to 25, a timing chart of the line memory pulses φLM1, φLM2 and the transferring pulses φH1 to φH6 supplied to the solid state imaging element shown in FIG. 19 is shown and the potential of the horizontal electric charge transfer passage 2 below the electrode sets H1 to H6 at the time t1 to t46 is also shown.

At the time t3, φLM1 is made to be on the low level and the R electric charge, which is accumulated in the electric charge accumulating portion 5 connected to the electric charge transferring stage below the electrode sets H3 and H5 in the electric charge accumulating region 5 below the memory electrode 6b applied with φLM1, is transferred to the electrode transferring stage.

Next, at the time between t4 to t8, the transferring pulses φH1 to H6 are controlled as shown in the drawing. Three R electric charges, which are adjacent to each other, in the R electric charges transferred to the horizontal electric charge transfer passage 2 at the time t3 are mixed with each other in the horizontal electric charge transfer passage 2. The thus mixed electric charges are transferred to the horizontal electric charge transfer passage 2 below the electrode set H2 at the time t9.

Next, at the time t11, φLM2 is made to be on the low level and the B electric charge, which is accumulated in the electric charge accumulating region 5 connected to the electric charge transferring stage below the electrode sets H4 and H6 in the electric charge accumulating region 5 below the memory electrode 6a applied with φLM2, is transferred to the electric charge transferring stage concerned.

Next, between the time t12 and t18, the transmission pulses φH1 to φH6 are controlled as shown in the drawing. Then, the three B electric charges, which are adjacent to each other, in the B electric charges transferred to the horizontal electric charge transfer passage 2 at the time t11 are mixed with each other in the horizontal electric charge transfer passage 2.

In this connection, in the first driving method, when the three R electric charges located below the electrode set H2 are transferred to below the adjoining electrode set H1 from the time t12 to the time t13, although the potential of the horizontal electric charge transfer passage 2 below the electrode set H2 is changed from the low level to the high level, the transmission is executed. In this case, there is a possibility that the R electric charge flows into another electric charge transmission stage. Therefore, in the second driving method, after the potential of the packet, in which the R electric charges are accumulated, has been made to be on the high level at the time t13, the R electric charges in the packet concerned are transferred to below the adjoining electrode set H1. Due to the foregoing, it is possible to prevent the leakage of the transmission described above.

Next, at the time t20, φLM1 is made to be on the low level and the R electric charge, which is accumulated in the electric charge accumulating region 5 connected to the electric charge transferring stage below the electrode sets H1 in the electric charge accumulating region 5 below the memory electrode 6b applied with φLM1, is transferred to the electric charge transferring stage concerned. In the electric charge transferring stage, the three R electric charges, which are mixed with each other, are existing. Therefore, at the point of time t20, the mixing of the four R electric charges is completed.

Next, between the time t21 and t24, the transmission pulses φH1 to φH6 are controlled as shown in the drawing and the four R electric charges, which are mixed with each other, are transferred to the horizontal electric charge transfer passage 2 below the electrode set H6 and the three B electric charges, which are mixed with each other, are transferred to the horizontal electric charge transfer passage 2 below the electrode set H2.

Next, at the time t26, φLM2 is made to be on the low level and the B electric charge, which is accumulated in the electric charge accumulating region 5 connected to the electric charge transferring stage below the electrode set H2 in the electric charge accumulating region 5 below the memory electrode 6a applied with φLM2, is transferred to the electric charge transferring stage concerned. In the electric charge transferring stage concerned, the three B electric charges, which are mixed with each other, are existing. Therefore, at the point of time t26, the mixing of the four B electric charges is completed.

Next, at the time t29, φLM1 is made to be on the low level and the G electric charge, which is accumulated in the electric charge accumulating region 5 connected to the electric charge transferring stage below the electrode set H4 in the electric charge accumulating region 5 below the memory electrode 6b applied with φLM1, is transferred to the electric charge transferring stage concerned.

Next, in order to prevent the leakage of the electric charges described above, the potential of the horizontal electric charge transfer passage 2 below the electrode sets H6 and H2 is made to be on the high level at the time t31. Next, at the time t32, the G electric charge located in the horizontal electric charge transfer passage 2 below the electrode set H4 is transferred to the horizontal electric charge transfer passage 2 below the electrode set H3.

Next, at the time t34, φLM2 is made to be on the low level and the G electric charge, which is accumulated in the electric charge accumulating region 5 connected to the electric charge transferring stage below the electrode set H3 in the electric charge accumulating region 5 below the memory electrode 6a applied with φLM2, is transferred to the electric charge transferring stage concerned.

Next, in order to prevent the leakage of the electric charges described before, at the time t36, the potential of the horizontal electric charge transfer passage 2 below the electrode sets H5 and H11 is made to be on the high level. Next, at the time t37, the two G electric charges, which are mixed with each other, located in the horizontal electric charge passage 2 below the electrode set H3 are transferred to the horizontal electric charge transfer passage 2 below the electrode set H2 or H6.

Next, at the time t39, φLM1 is made to be on the low level and the G electric charge, which is accumulated in the electric charge accumulating region 5 connected to the electric charge transferring stage below the electrode sets H2 and H6 in the electric charge accumulating region 5 below the memory electrode 6b applied with φLM1, is transferred to the electric charge transferring stage concerned.

Next, in order to prevent the leakage of the electric charges described before, at the time t41, the potential of the horizontal electric charge transfer passage 2 below the electrode set R4 is made to be on the high level. Next, at the time t42, the three G electric charges, which are mixed with each other, located in the horizontal electric charge passage 2 below the electrode set H2 are transferred to the horizontal electric charge transfer passage 2 below the adjoining electrode set H1 and the three G electric charges, which are mixed with each other, located in the horizontal electric charge passage 2 below the electrode set H6 are transferred to the horizontal electric charge transfer passage 2 below the adjoining electrode set H5.

Next, at the time t44, φLM2 is made to be on the low level and the G electric charge, which is accumulated in the electric charge accumulating region 5 connected to the electric charge transferring stage below the electrode sets H1 and H5 in the electric charge accumulating region 5 below the memory electrode 6a applied with φLM2, is transferred to the electric charge transferring stage concerned. In the electric charge transferring stage concerned, the three G electric charges, which are mixed with each other, are existing. Therefore, at the point of time t44, the mixing of the four G electric charges is completed.

After that, when the transferring pulses φH1 to φH6 are controlled, the mixed electric charges R, G and B are successively transferred in the horizontal direction X, so that the outputting of signals corresponding to the electric charges of one line can be completed. When the above processing is executed for all lines, it is possible to obtain signals from all the photoelectric conversion elements.

As described above, according to the second driving method, it is possible to prevent a leakage of the electric charges which could be caused in the first driving method and further it is possible to execute photographing movies of a high frame rate and quality.

Fifth Embodiment

In the present embodiment, explanations will be made into a method in which the horizontal electric charge transfer passage 2 of the solid state imaging element shown in FIG. 10 is subjected to the 8-phase driving by the transferring pulses φH1 to φH8.

Figure 26:
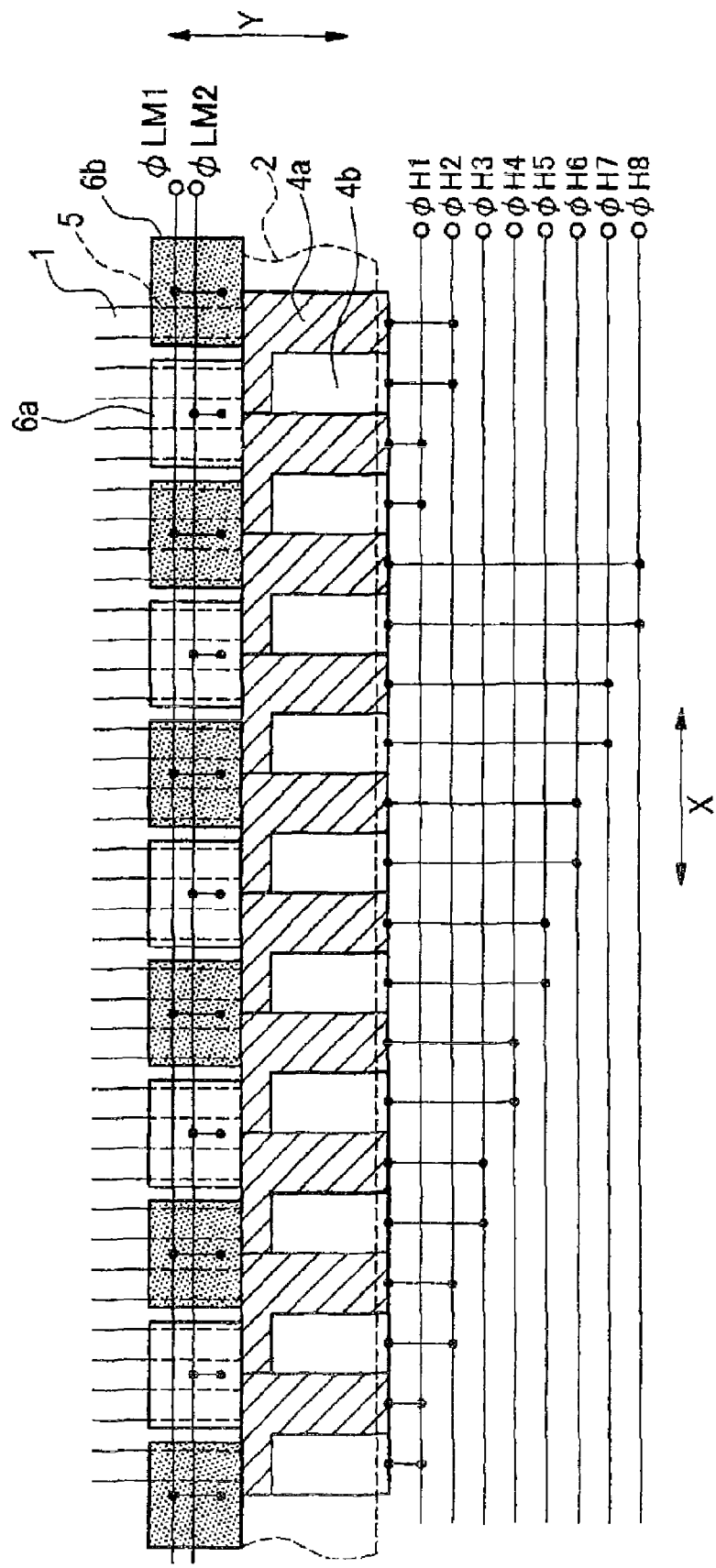
FIG. 26 is a view showing an example of wiring necessary for the 8-phase driving of the horizontal electric charge transfer passage of the solid state imaging element composed as shown in FIG. 10.

FIG. 26 is a view showing an example of wiring necessary for the 8-phase driving of the horizontal electric charge transfer passage 2 of the solid state imaging element composed as shown in FIG. 10. Like reference marks are used to indicate like components in FIGS. 10 and 26.

A plurality of electrode sets are provided above the horizontal electric charge transfer passage 2 of the solid state imaging element shown in FIG. 1. However, in the solid state imaging element shown in FIG. 26, these electrode sets include: an electrode set H1 upon which the transferring pulse φH1 is applied by the imaging element driving portion mounted on an image pickup device not shown; an electrode set φH2 upon which the transferring pulse φH2 is applied by the imaging element driving portion; an electrode set H3 upon which the transferring pulse φH3 is applied by the imaging element driving portion; an electrode set H4 upon which the transferring pulse φH4 is applied by the imaging element driving portion; an electrode set H5 upon which the transferring pulse φH5 is applied by the imaging element driving portion; an electrode set H6 upon which the transferring pulse φH6 is applied by the imaging element driving portion; an electrode set H7 upon which the transferring pulse φH7 is applied by the imaging element driving portion; and an electrode set H8 upon which the transferring pulse φH8 is applied by the imaging element driving portion. The transferring pulses φH1 to φH8 can be respectively put into the states of a high and the low level.

These electrode sets are arranged in such a manner that groups of the electrode sets, in which the electrode sets H1, H2, H3, H4, H5, H6, H7, H8 are arranged in this order, are repeatedly arranged in the horizontal direction.

Next, a driving method of driving the solid state imaging element shown in FIG. 26 will be explained below. The following explanations are made under the condition that an arrangement of the photoelectric conversion elements of the solid state imaging element is the same as that shown in FIG. 6B.

Figure 27:
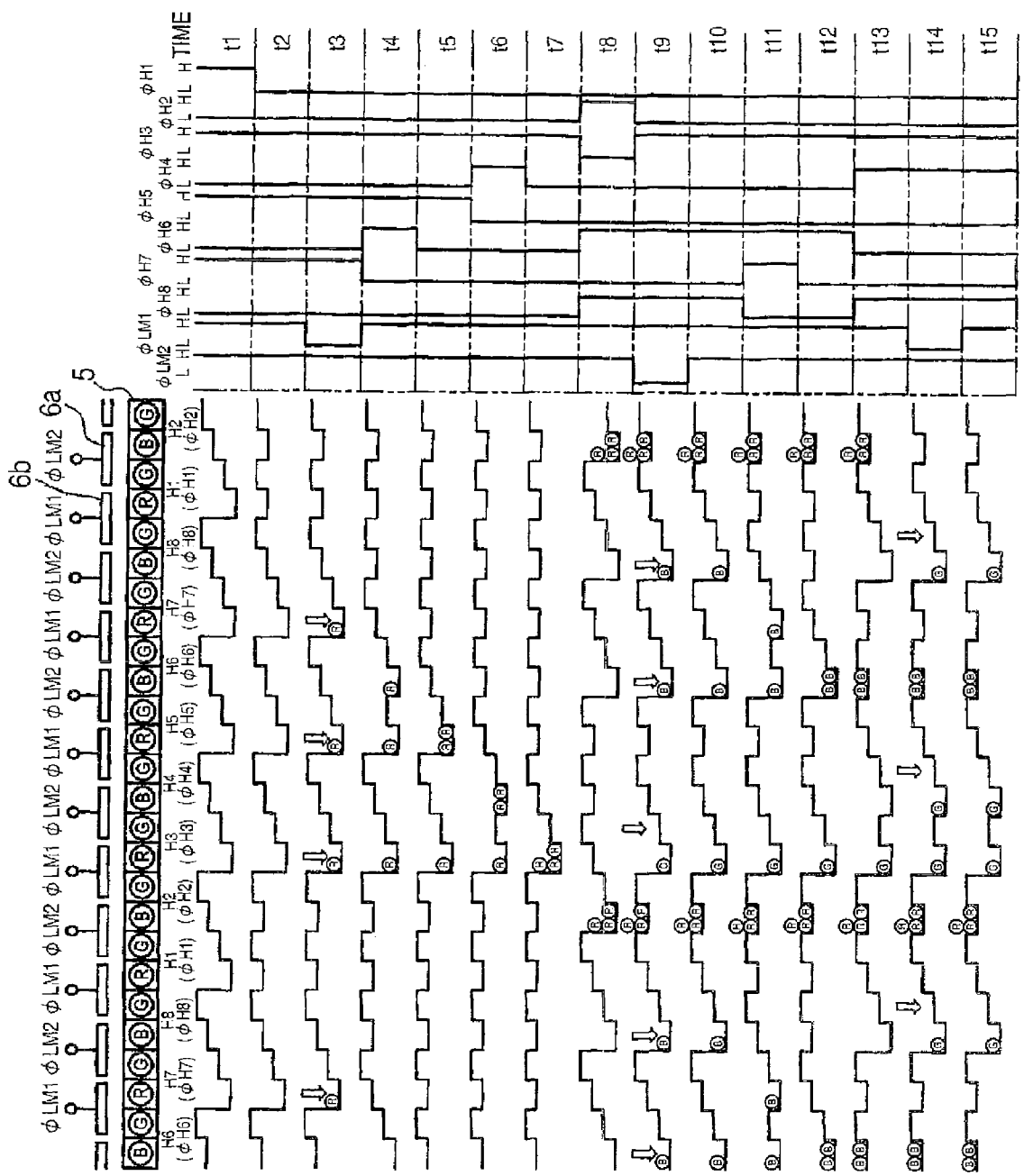
FIG. 27 is a view for explaining a driving method of driving the solid state imaging element shown in FIG. 26.
Figure 28:
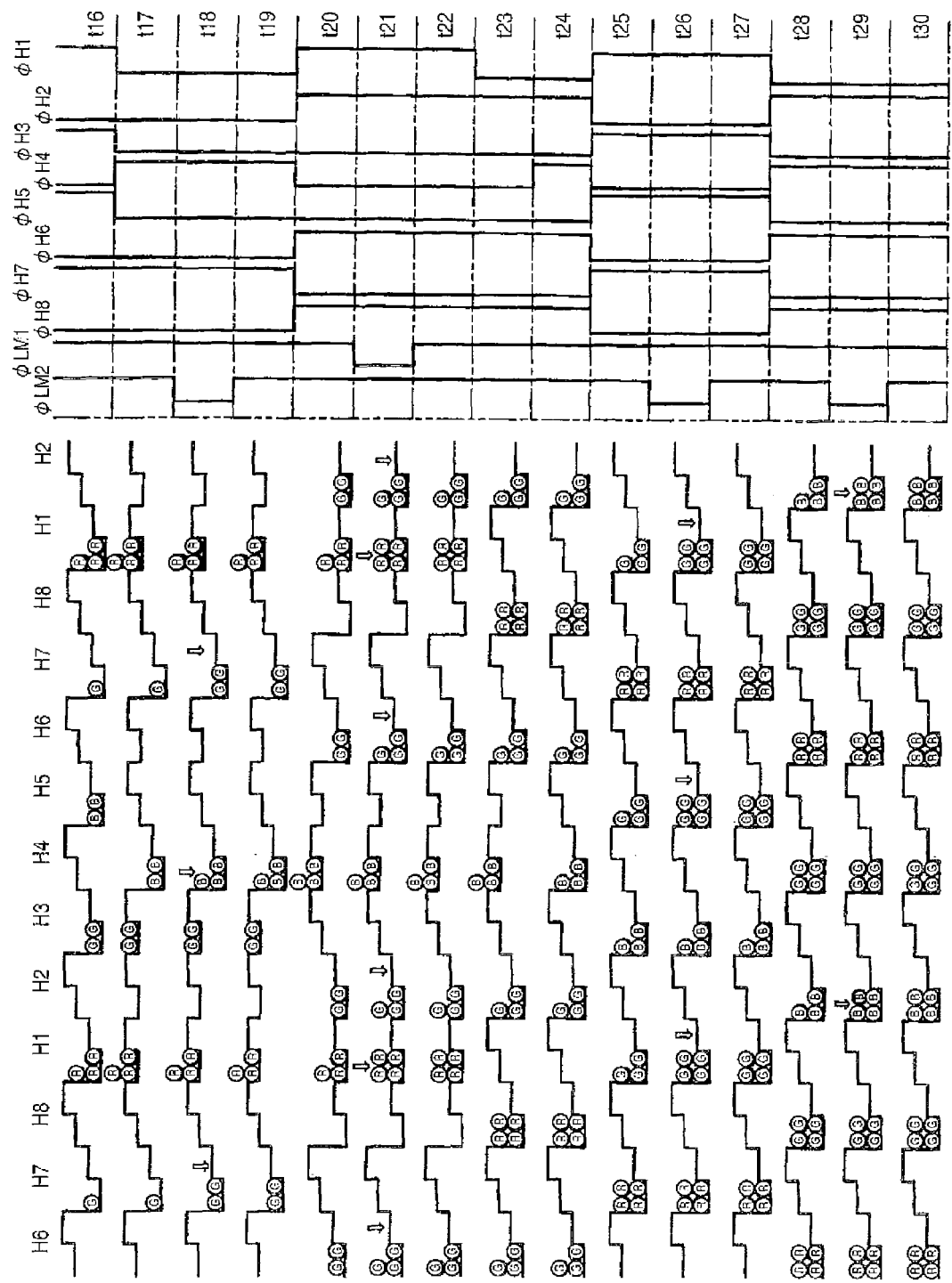
FIG. 28 is a view for explaining a driving method of driving the solid state imaging element shown in FIG. 26.

FIGS. 27 to 28 are views for explaining the driving method of driving the solid state imaging element shown in FIG. 26. In FIGS. 27 to 28, a timing chart of the line memory pulses φLM1, φLM2 and the transferring pulses φH1 to φH8 supplied to the solid state imaging element shown in FIG. 26 is shown and the potential of the horizontal electric charge transfer passage 2 below the electrode sets H1 to H8 at the time t1 to t30 is also shown.

At the time t3, φLM1 is made to be on the low level and the R electric charge, which is accumulated in the electric charge accumulating portion 5 connected to the electric charge transferring stage below the electrode sets H3, H5 and H7 in the electric charge accumulating region 5 below the memory electrode 6b applied with φLM1, is transferred to the electrode transferring stage.

Next, at the time between t4 to t7, the transferring pulses φH1 to φH8 are controlled as shown in the drawing. Three R electric charges, which are adjacent to each other, in the R electric charges transferred to the horizontal electric charge transfer passage 2 at the time t3 are mixed with each other in the horizontal electric charge transfer passage 2. The thus mixed electric charges are transferred to the horizontal electric charge transfer passage 2 below the electrode set H2 at the time t8.

Next, at the time t9, φLM2 is made to be on the low level and the B or G electric charge, which is accumulated in the electric charge accumulating region 5 connected to the electric charge transferring stage below the electrode sets H3, H6 and H8 in the electric charge accumulating region 5 below the memory electrode 6a applied with φLM2, is transferred to the electric charge transferring stage concerned.

Next, between the time t10 and t12, the transmission pulses φH1 to φH8 are controlled as shown in the drawing. Then, the two B electric charges, which are adjacent to each other, in the B electric charges transferred to the horizontal electric charge transfer passage 2 at the time t9 are mixed with each other in the horizontal electric charge transfer passage 2.

Next, at the time t14, φLM1 is made to be on the low level and the G electric charge, which is accumulated in the electric charge accumulating portion 5 connected to the electric charge transferring stage below the electrode sets H4 and H8 in the electric charge accumulating region 5 below the memory electrode 6b applied with φLM1, is transferred to the electrode transferring stage.

Next, at the time between t15 to t16, the transferring pulses φH1 to φH8 are controlled as shown in the drawing and the two G electric charges located below the electrode sets H3 and H4 are mixed in the vertical electric charge transfer passage 2.

Next, at the time t17, the electric charge B located in the horizontal electric charge transfer passage 2 below the electrode set H5 is transferred to the horizontal electric charge transfer passage 2 below the electrode set H4.

Next, at the time t18, φLM2 is made to be on the low level and the B electric charge, which is accumulated in the electric charge accumulating region 5 connected to the electric charge transferring stage below the electrode set H4 in the electric charge accumulating region 5 below the memory electrode 6a applied with φLM2, is transferred to the electric charge transferring stage concerned and the G electric charge, which is accumulated in the electric charge accumulating region 5 connected to the electric charge transferring stage below the electrode set H7 in the electric charge accumulating region 5 below the memory electrode 6a applied with φLM2, is transferred to the electric charge transferring stage concerned.

Next, at the time t20, the two G electric charges, which are mixed with each other, located in the horizontal electric charge transfer passage 2 below the electrode set H3 are transferred to the horizontal electric charge transfer passage 2 below the adjoining electrode set H2. The two G electric charges, which are mixed with each other, located in the horizontal electric charge transfer passage 2 below the electrode set H7 are transferred to the horizontal electric charge transfer passage 2 below the adjoining electrode set H6.

At the time t21, φLM1 is made to be on the low level and the G electric charge, which is accumulated in the electric charge accumulating region 5 connected to the electric charge transferring stage below the electrode sets H2 and H6 in the electric charge accumulating region 5 below the memory electrode 6b applied with φLM1, is transferred to the electric charge transferring stage concerned. The R electric charge, which is accumulated in the electric charge accumulating region 5 connected to the electric charge transferring stage below the electrode set H1 in the electric charge accumulating region 5 below the memory electrode 6b applied with φLM1, is transferred to the electric charge transferring stage concerned.

Next, at the time between t23 and t25, the transferring pulses φH1 to φH8 are controlled as shown in the drawing and the four R electric charges located below the electrode set H1 are transferred to below the electrode set H7 and the three G electric charges located below the electrode set H2 are transferred to below the adjoining electrode set H1 and further the three G electric charges located below the electrode set H6 are transferred to below the adjoining electrode set H5 and further the three B electric charges located below the electrode set H4 are transferred to below the adjoining electrode set H3.

At the time t26, φLM2 is made to be on the low level and the G electric charge, which is accumulated in the electric charge accumulating portion 5 connected to the electric charge transferring stage below the electrode sets H1 and H5 in the electric charge accumulating region 5 below the memory electrode 6a applied with φLM2, is transferred to the electrode transferring stage.

Next, at the time between t27 and t28, the transferring pulses φH1 to φH8 are controlled as shown in the drawing and the four R electric charges located below the electrode set H7 are transferred to below the adjoining electrode set H6 and the four G electric charges located below the electrode set H1 are transferred to below the adjoining electrode set H8 and further the four G electric charges located below the electrode set H5 are transferred to below the adjoining electrode set H4 and further the three B electric charges located below the electrode set H3 are transferred to below the adjoining electrode set H2.

Next, at the time t29, φLM2 is made to be on the low level and the B electric charge, which is accumulated in the electric charge accumulating region 5 connected to the electric charge transferring stage below the electrode sets H2 in the electric charge accumulating region 5 below the memory electrode 6b applied with φLM2, is transferred to the electric charge transferring stage concerned.

After that, when the transferring pulses φH1 to φH8 are controlled, the mixed R electric charge, the mixed G electric charge and the mixed B electric charge are successively transferred in the horizontal direction X and the signals corresponding to the electric charges of one line are outputted. When the above processing is executed for all lines, signals can be obtained from all the photoelectric conversion elements.

As described above, according to the solid state imaging element, the constitution of which is shown in FIG. 26, the transferring processing of the electric charges from the electric charge accumulating region 5 to the horizontal electric charge transfer passage 2 can be finely controlled by the combination of the line memory pulses φLM1, φLM2 with the transferring pulses φH1 to φH8. Therefore, the processing, in which four electric charges of the same color component in the electric charges accumulated in all the electric charge accumulating regions 5 are mixed with each other in the horizontal electric charge transfer passage 2, can be realized by changing pulses only 29 times. Therefore, as compared with a case in which four electric charges are mixed with each other in the conventional constitution, the processing time can be greatly reduced. As a result, when this four pixel mixing processing is employed for the movie photographing mode, it is possible to attain a high frame rate even it the number of pixels is increased.

Further, according to the present driving method, even after the electric charges have been mixed, an arrangement of the electric charges is not changed. Therefore, it is possible to generate image data without executing a special signal processing. From this point of view, it is possible to realize a high frame rate.

According to the present invention, even in the case where the number of pixels is increased without expanding a horizontal electric charge transfer passage in size, it is possible to provide a solid state imaging element capable of solving the problems of a decrease in the electric charge transferring capacity of a horizontal electric charge transfer passage, an increase in the electric power consumption and a deterioration of the transferring efficiency.

The entire disclosure of each and every foreign patent application from which the benefit of foreign priority has been claimed in the present application is incorporated herein by reference, as if fully set forth.

What is claimed is:

1. A solid state imaging element comprising:
   photoelectric conversion elements;
   a plurality of vertical electric charge transfer passages that transfer, in a vertical direction, electric charges generated by the photoelectric conversion elements; and
   a horizontal electric charge transfer passage that transfers, in a horizontal direction perpendicular to the vertical direction, the electric charges transferred in the vertical electric charge transfer passage,
   wherein the horizontal electric charge transfer passage comprises a plurality of electric charge transferring stages each of which operates as an electric charge accumulating region or a barrier region according to a level of an applied voltage,
   each of said plurality of electric charge transferring stages is connected to plural ones of the vertical electric charge transfer passages, and
   a line memory, the line memory comprising: a plurality of electric charge accumulating regions each of which connects each of said plurality of vertical electric charge transfer passages with the horizontal electric charge transfer passages; and memory electrodes each of which is connected with different ones of the electric charge transferring stages and is independently arranged in an upper portion of adjacent two ones of the electric charge accumulating regions, wherein the memory electrodes comprises a first set of memory electrodes and a second set of memory electrodes that are each independently capable of applying voltage.

2. A solid state imaging element according to claim 1, wherein the photoelectric conversion elements comprise three types of photoelectric conversion elements that detect light of respectively different wave-length regions, and the three types of photoelectric conversion elements are arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

3. An image pickup device comprising:

a solid state imaging element according to claim 1; and a drive section that drives the solid state imaging element, wherein each of the electric charge transferring stages is connected to two of the vertical electric charge transfer passages, and after electric charges have been accumulated in said plurality of electric charge accumulating regions respectively, the driving section controls voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

4. An image pickup device according to claim 3, wherein the photoelectric conversion elements comprise three types of photoelectric conversion elements that detect light of respectively different wave-length regions, and the three types of photoelectric conversion elements are arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

5. A method of driving a solid state imaging element, the solid state imaging element comprising:

photoelectric conversion elements;

a plurality of vertical electric charge transfer passages that transfer, in a vertical direction, electric charges generated by the photoelectric conversion elements; and a horizontal electric charge transfer passage that transfers, in a horizontal direction perpendicular to the vertical direction, the electric charges transferred in the vertical electric charge transfer passage, wherein the horizontal electric charge transfer passage comprises a plurality of electric charge transferring stages each of which operates as an electric charge accumulating region or a barrier region according to a level of a applied voltage, and each of said plurality of electric charge transferring stages is connected to two of the vertical electric charge transfer passages, wherein the solid state imaging element further comprises a line memory, the line memory comprising: a plurality of electric charge accumulating regions each of which connects each of said plurality of vertical electric charge transfer passages with the horizontal electric charge transfer passages; and memory electrodes each of which is connected with different ones of the electric charge transferring stages and is independently arranged in an upper portion of adjacent two ones of the electric charge accumulating regions, and wherein the memory electrodes comprises a first set of memory electrodes and a second set of memory electrodes that are each independently capable of applying voltage, the method comprising:

after electric charges have been accumulated in said plurality of electric charge accumulating regions, controlling voltage applied upon the first and the second sets of memory electrodes and voltage applied upon said plurality of electric charge transferring stages, so as to mix four electric charges of the same color components among the electric charges accumulated in the electric charge accumulating regions, in the horizontal electric charge transfer passage and transmit the mixed electric charges.

6. A method of driving a solid state imaging element according to claim 5, wherein the photoelectric conversion elements comprise three types of photoelectric conversion elements that detect light of respectively different wave-length regions, and the three types of photoelectric conversion elements are arranged so that the electric charges of first and second color components can be alternately arranged in the horizontal direction while the electric charge of the third color component is being interposed between the electric charges of first and second color components under the condition that the electric charges are accumulated in said plurality of electric charge accumulating regions.

* * * * *